US011889289B2

(12) United States Patent
Norris et al.

(10) Patent No.: US 11,889,289 B2
(45) Date of Patent: *Jan. 30, 2024

(54) PROVIDING BINAURAL SOUND BEHIND A VIRTUAL IMAGE BEING DISPLAYED WITH A WEARABLE ELECTRONIC DEVICE (WED)

(71) Applicants: Glen A. Norris, Tokyo (JP); Philip Scott Lyren, Wadsworth, OH (US)

(72) Inventors: Glen A. Norris, Tokyo (JP); Philip Scott Lyren, Wadsworth, OH (US)

(\*) Notice: Subject to any disclaimer, the term of this patent is extended or adjusted under 35 U.S.C. 154(b) by 0 days.

This patent is subject to a terminal disclaimer.

(21) Appl. No.: 17/703,528

(22) Filed: Mar. 24, 2022

(65) Prior Publication Data
US 2022/0217491 A1 Jul. 7, 2022

Related U.S. Application Data

(63) Continuation of application No. 17/062,637, filed on Oct. 5, 2020, now Pat. No. 11,290,836, which is a continuation of application No. 16/354,182, filed on Mar. 15, 2019, now Pat. No. 10,805,758, which is a continuation of application No. 16/246,501, filed on Jan. 13, 2019, now Pat. No. 10,791,409, which is a continuation of application No. 15/603,552, filed on May 24, 2017, now Pat. No. 10,219,095.

(51) Int. Cl.
| H04S 7/00 | (2006.01) |
| H04N 7/14 | (2006.01) |
| H04N 7/15 | (2006.01) |
| G06V 10/10 | (2022.01) |
| G06V 40/16 | (2022.01) |
| H04N 23/60 | (2023.01) |
| H04N 23/611 | (2023.01) |

(52) U.S. Cl.
CPC .............. *H04S 7/303* (2013.01); *G06V 10/17* (2022.01); *G06V 40/161* (2022.01); *G06V 40/165* (2022.01); *G06V 40/172* (2022.01); *H04N 7/141* (2013.01); *H04N 7/147* (2013.01); *H04N 7/15* (2013.01); *H04N 23/60* (2023.01); *H04N 23/611* (2023.01); *H04S 7/40* (2013.01); *H04N 2007/145* (2013.01); *H04S 2420/00* (2013.01)

(58) Field of Classification Search
CPC ........ H04S 7/303; H04S 7/40; H04S 2420/00; G06V 10/17; G06V 40/165; G06V 40/172; G06V 40/161; H04N 23/60; H04N 23/611; H04N 7/141; H04N 7/147; H04N 7/15; H04N 2007/145
See application file for complete search history.

(56) References Cited

U.S. PATENT DOCUMENTS

| 2005/0053249 A1* | 3/2005 | Wu | ............................ | H04S 7/30 381/310 |
| 2009/0041254 A1* | 2/2009 | Jin | .......................... | H04S 7/304 381/1 |

(Continued)

*Primary Examiner* — Joseph Saunders, Jr.

(57) ABSTRACT

A wearable electronic device (WED) worn on a head of a user displays a virtual image that has sound. One or more processors process the sound for the virtual image into binaural sound for the user. The binaural sound has a sound localization point (SLP) with a coordinate location that occurs behind the virtual image while the image is located a near-field distance from the head of the user.

20 Claims, 11 Drawing Sheets

(56) References Cited

U.S. PATENT DOCUMENTS

| | | | |
|---|---|---|---|
| 2009/0169037 A1* | 7/2009 | Park | H04R 5/02 |
| | | | 381/309 |
| 2015/0245159 A1* | 8/2015 | Osman | H04S 7/304 |
| | | | 381/303 |
| 2016/0212272 A1* | 7/2016 | Srinivasan | H04N 21/41407 |
| 2017/0366913 A1* | 12/2017 | Stein | H04S 7/304 |

* cited by examiner

PROVIDING BINAURAL SOUND BEHIND A VIRTUAL IMAGE BEING DISPLAYED WITH A WEARABLE ELECTRONIC DEVICE (WED)

BACKGROUND

Three-dimensional (3D) sound localization offers people a wealth of new technological avenues to not merely communicate with each other but also to communicate more efficiently with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

SUMMARY

Methods and apparatus improve a user experience during situations in which a listener localizes electronically-generated binaural sounds. The sound is convolved or processed to a location that is behind or near a source of the sound so that the listener perceives the location of the sound as originating from the source of the sound.

Other example embodiments are discussed herein.

DETAILED DESCRIPTION

Figure 1:
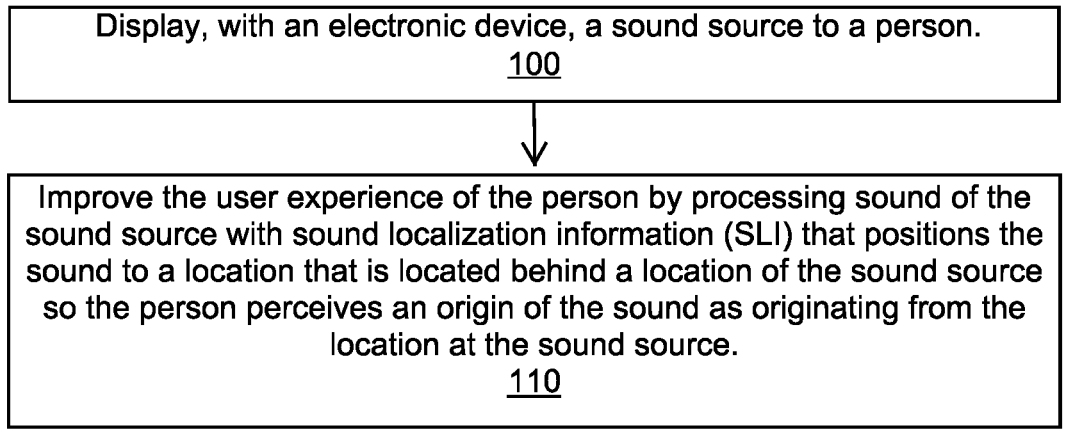
FIG. 1 is a method that improves a user experience while listening to binaural sound that localizes to a sound source in accordance with an example embodiment.

Example embodiments include methods and apparatus that improve a user experience during a telephone call or other form of electronic communication.

One problem with electronically generated binaural sound or three-dimensional (3D) sound rendering is that listeners have a difficult time determining a location where the sound originates when this location is close to the listener. For example, when the location of the origination of binaural sound is convolved to less than one meter from the person (considered to be "near-field") it may be more difficult for the person to determine a location or direction of a binaural sound. Whereas, a listener may have more success in external localization when the binaural sound is processed to originate from about one meter or more from the person (considered to be "far-field").

Head related transfer functions (HRTFs) describe how a sound wave changes as it interacts with the torso, head, and pinnae of the listener. HRTFs do not vary substantially in the far-field range. By contrast, HRTFs can vary significantly in the near-field range. Such variations can be significant depending on the frequency of the sound (e.g., sound below 500 Hz) as frequency at near-field distance has a large impact on interaural level difference (ILD). Further, modeling near-field virtual auditory space with HRTFs can be quite complex.

These issues become problematic when an electronic device attempts to convolve sound so the binaural sound originates to the listener in the near-field range. The listener may perceive the sound as originating from the wrong location or be unable to localize an origin of the sound. Additionally, convolving sound with near-field HRTFs can be computationally complex and processor-intensive.

Another problem with electronically generated binaural sound occurs when the perceived location of where the sound originates does not match a location of an image of the sound. For example, a computer or electronic system convolves or processes a stream of sound or sound (e.g., a voice or sound from a game character or object or other virtual sound source) from a video call or telephone software application, computer game, or a social VR (virtual reality) or AR (augmented reality) software application. The listener then hears the stream of sound as if the sound is originating from a certain point in space where an image is located in the physical or virtual environment around the listener. The effectiveness of the user experience is lost on the listener if the listener is not able to localize or hear the convolved or processed sound at the location of the image. This situation can occur, for example, when the image is located at a near-field distance from the listener or the image is occluded or not visible to the listener (e.g., occluded by a physical or virtual object). At the source of the sound can be something visible (such as a real or virtual object that the listener sees) or at the sound source there may be no visual cue or image (such as a real or virtual object that the listener does not see). As such, instances arise when the location where the listener perceives an origin of sound does not match an image at the source of the sound or match the intended location for the sound. Example embodiments solve these problems and others in order to improve the user experience of the listener communicating, navigating, or operating with binaural sound in physical or virtual space.

Consider an example in which a listener wears a head mounted display or other wearable electronic device and sees a visible source of the sound that is an image of a caller during a telephone call. The voice of the caller is not heard to originate from the image shown with the display, but instead originates from a location away from the image. This situation would not provide the listener with a credible user experience since the voice of the caller is not originating at the image of the caller.

Binaural sound or 3D audio becomes more realistic when a perceived location of where the sound originates matches or aligns with a visible source of the sound, such as an image or object. The realism and user experience significantly decrease when the location of the origination of the sound does not align with a visible source of the sound.

The problem of aligning a binaural sound with a visible source of the sound becomes exacerbated when the source of the sound is within a near-field distance of the listener. In this situation, even when the sound is convolved with near-field HRTFs in order for the sound to originate from the near-field visible source of the sound, the convolved sound may fail to accurately localize to a listener due to the lower reliability of externalization from near-field HRTFs relative to far-field HRTFs.

These problems can also occur when the source of the sound is not visible but the listener knows a location of the source of sound. For example, a listener sees and talks with another person and then momentarily looks away in another direction.

During the moment of looking away, the listener does not see the other person, but knows a precise location or area where he or she is located. The listener expects a voice from the other person to originate from the location.

One way to convolve binaural sound is to convolve the sound to a location where the sound source is visually perceived (e.g., convolve the sound to the coordinate location of the image, virtual sound source (VSS), avatar, or display). In some instances, it may be difficult, undesirable, or impossible to convolve the sound to the visually perceived location of the sound source. For example, the electronic device convolving the sound is not able to select HRTFs with coordinates that match coordinates of the sound source or a location of the sound source as presented to the listener. Such HRTFs may not exist. Further, selecting or deriving such HRTFs may be process-intensive or have another disadvantage. So where should sound be convolved to localize in these instances? What HRTFs should be selected, if any?

Example embodiments solve these problems and improve the user experience of a listener externally localizing binaural sound.

Electronic devices with example embodiments displaying the sound source or providing sound may not include speakers to generate sound or may include speakers but the electronic device does not generate sound with the speakers.

Instead, a listener may receive the sound from a handheld or portable electronic device, such as headphones, earphones, earbuds, a wearable electronic device, an electronic device that provides sound from bone conduction, or another type of electronic device that provides binaural sound to a listener. Further, the electronic devices may include wireless and wired electronic devices, such as wireless earphones, wireless headphones, electronic glasses with earphones or earbuds, a head mounted display (HMD) or optical head mounted display (OHMD) with earphones or earbuds, a smartphone with wireless earphones or earbuds, etc.

Electronic devices of example embodiments are not required to emit sound to a listener in a conventional manner (e.g., with speakers at the electronic device that transmit sound through the air to the listener). For example, an electronic device is a smartphone, computer, television, display, or other electronic device with speakers muted, decoupled, or powered off. Nevertheless, it may be useful or convenient for a listener to localize sound at the electronic device. For instance, binaural sound localizes to an image displayed on or through the display of the electronic device when such an electronic device is not providing sound to the listener in the conventional manner.

Although sound may not emanate from speakers of an electronic device in a conventional way, example embodiments process the sound to appear to the listener to originate or emanate from a sound source or particular location (e.g., at the electronic device, behind the electronic device, in front of the electronic device, to a side of the electronic device, or to another location). The binaural sound causes the listener to perceive the sound as originating from or localizing at the sound source even though the sound source emits no sound through the air. Instead, the listener hears the convolved binaural sound through earphones, earbuds, headphones, wearable electronic device, or another apparatus.

One or more processors (such as a digital signal processor or DSP) processes or convolves the sound to a location that is not coincident with or not at the location of the sound source. For example, a DSP processes the sound to localize to a coordinate location that does not match a coordinate location of the sound source. Nevertheless, the listener hears the sound as originating from or believes that the sound originates from the sound source. Sound originates to the listener at a sound localization point (SLP) that is coincident with or at the sound source. The SLP experienced by the listener is influenced but not dictated by the HRTF pair convolving the sound. Likewise a visual image that a listener associates with an auditory event also influences the SLP. For example, a sound of a dog barking is convolved to a location in front of a listener at a distance of three meters, and the sound is stored in a file. The sound file is played to a blindfolded listener who, externalizing the binaural sound, approximates that a dog is three meters away. The distance of the SLP of the barking sound is three meters. Consider a listener without a blindfold, also hearing the sound file of the barking dog convolved to the distance of three meters, and in addition, seeing an image of a barking dog in front of him or her two meters away. In this case the listener, seeing the image of the dog associated with the auditory event of the sound of the dog, localizes the barking sound to the associated sound source (at two meters). Although a single sound file is played, the SLP for the seeing listener is two meters from him or her, whereas the SLP for the blindfolded listener is three meters from him or her. Thus a sound convolved with a certain pair of HRTFs is externalized at different SLPs depending on the circumstances, situation, and/or listener.

Example embodiments include methods and apparatus that help to solve these problems and other problems with binaural sound. Example embodiments improve realism and the user experience of a listener listening to binaural sound when the sound source or source of the sound is close to the listener, such as being in a near-field range from the listener. Further, example embodiments are applicable to both visible and non-visible sound sources.

One or more of several different techniques of executing hardware and/or software convolve the sound so the listener believes that the sound originates from the sound source when in fact the sound is convolved to a different location. These techniques include placing or positioning the origination point of the sound on a line-of-sight with the sound source, placing the origination of the sound on an imaginary line from the head of the listener (e.g., a point between the ears of the listener) to the sound source, placing the origination of the sound behind the sound source, simulating the direction of the sound as though coming from the direction of the sound source, adjusting a volume of the sound to be commensurate with the distance to the sound source, and executing other example embodiments discussed herein.

FIG. 1 is a method that improves a user experience while listening to binaural sound that localizes to a sound source.

Block 100 states display, with an electronic device, a sound source to a person.

In an example embodiment, the sound source is visible to the person, such as being in a field-of-view or line-of-sight of the person. For instance, the listener sees an image on, through, or with a display of an electronic device. Alternatively, the sound source is not visible to the person, such as not being in a field-of-view or line-of-sight of the person. For instance, an image or a virtual object is shown on an electronic display as behind the listener, in another room, or presently not visible. As another example, the electronic display is behind the listener, in another room, or presently not visible.

By way of example, the electronic device is a smartphone, a tablet computer, a notebook or laptop computer, a desktop computer, a television, a display, an electronic watch, a screen, a portable electronic device (PED), a handheld portable electronic device (HPED), a non-portable computer or non-portable electronic device. For instance, the electronic device is a smartphone or tablet computer held in a hand of the person, a laptop computer or tablet computer or desktop computer resting on a surface in front of the person, an electronic watch with a display on a wrist of the person, a portable electronic device on a lap of the person while the person sits in a chair or passenger seat, a television in a home, store, or other public place, a home appliance, a display mounted on or affixed to an object (such as a wall or dashboard), or an advertising display (such as an edge display or counter display or other electronic device that provides advertisements to people).

For example, the sound source is an image, such as a video, a picture, an AR image (e.g., an image of a virtual sound source), a VR image or a combination of one or more of these images. For instance, the sound source is a real-time video of a person captured with a camera and displayed to the person, an AR image displayed with a wearable electronic device (e.g., electronic glasses or a smartphone mounted to a wearable head mount), a VR image displayed with a head mounted display (HMD), a two-dimensional (2D) image on a flat display (e.g., a TV or an advertisement display), a 3D image, a stationary image, a moving image, a recorded image, a real-time image, a hologram, or another image that is generated, reproduced, or displayed with an electronic device.

Block 110 states improve the user experience of the person by processing sound of the sound source with sound localization information (SLI) that positions the sound to a location that is located behind a location of the sound source so the person perceives an origin of the sound as originating from the location at the sound source.

The position to where the sound is convolved is not the location of the sound source. Instead, the location where the sound is convolved is behind the sound source from the point-of-view of the listener.

As noted, in some instances, it may be difficult, undesirable, or impossible to convolve sound to the location of the sound source. In these instances, an example embodiment selects HRTF pairs having coordinates of a position behind the sound source.

By way of example, the sound source is a display of a handheld portable electronic device (HPED) that the listener holds (e.g., a smartphone or tablet computer). The HPED displays an image of a talking person while the display is one to two feet in front of a face of the listener. The HPED selects a HRTF pair that has coordinates in a far-field range about 1.0 meter from the face of the listener. A processor in the HPED processes a voice of the talking person so the voice localizes to the coordinate location of the HRTF pair. The coordinate location is in front of the face of the listener, directly behind the image of the talking person on the display of the HPED, and located about 1.0 meter away from the face of the talking person. The listener hears or believes that the voice of the talking person originates from the image of the talking person on the display that is one to two feet away. This situation occurs even though the display is closer to the face of the listener than the selected coordinate location of the HRTFs being executed to convolve the voice of the talking person.

The listener thus perceives that the sound originates from the image even though the sound is convolved to originate from a position that is behind the image. This situation occurs because listeners are accustomed to hearing sound originate from a physical auditory event, such as at a physical object. Listeners consciously or unconsciously try to visually locate an object or event that corresponds to the sound and to associate or to place the origination of the sound at the object. Thus, even though the sound does not actually originate from the image, the brain ignores or reconciles a difference of position, resulting in the origin of the sound being localized at the image. When coordinates of the localization point occur beyond and behind the image, the sound localizes to the listener at the image. This situation also occurs because listeners have a difficult time in accurately judging exact or precise distances to an origin of sound, especially when the sound is not a voice and/or when the source of the sound is not visible to the listener. One or more example embodiments take advantage of these observations and trick the listener into believing that the sound originates from the sound source when in fact the sound is convolved to originate from a location that is behind the sound source.

Consider an example in which a processor processes sound with HRTFs having coordinates of a far-field location even though the location of the source of the sound (e.g., an image being displayed) is a near-field distance from the listener. In this example, the sound originates from behind the source of the sound. During this time, however, the listener perceives the sound as originating from the location at the source of the sound and not behind the source of the sound.

Consider an example embodiment that improves a user experience when an electronic device, an image, or an object is a source of sound that is located within a near-field distance from the person (e.g., less than one meter away from a face of the person). A processor processes or convolves the sound with far-field HRTFs so the sound originates to a listener beyond yet behind the electronic device, the image, or the object. Nevertheless, the listener believes that the sound originates from the location of the electronic device, the image, or the object.

In an example embodiment, a method improves a user experience during a video call or a telephone call between a person and another person when the person uses a HPED that is located within a near-field distance from the person. For instance, the person holds the HPED in front of his or her face to see a real-time video or image of the other person. For example, a camera captures video of the other person, and the person sees the video or an AR or VR image based on the video. One or more processors convolve a voice of the other person with far-field HRTFs to a coordinate location in empty space behind the HPED located at the near-field distance. The person would otherwise localize the voice of the other person at the coordinate location of the HRTFs in empty space. However, the person perceives the voice of the other person as originating from the HPED when the HPED is located between the face of the person and the location where the voice of the other person is convolved to the person. Thus, the person hears the sound as originating from the HPED at a near-field distance even though the coordinate location of the HRTFs is located behind the HPED at a far-field distance.

Consider an example embodiment in which the sound source is at an HPED or smartwatch and not an image of a person; and the sound at the sound source is a chime or alert sound. For instance, a listener wears headphones that are coupled to multiple electronic devices that are within near-field and/or far-field distances. When the listener hears an alert sound, music, or announcement issued by one of the electronic devices, the example embodiment convolves the sound to a far-field point on the line extending from his or her head toward the electronic device that issued the sound. Processing the sound in this manner allows the listener to monitor which one of the electronic devices issues the sound.

Consider an example embodiment that convolves or processes sound so the coordinates to where the sound is located occur behind an image that is the source of sound to the listener. For example, a head of a listener is located at an origin with spherical coordinates of (0, 0, 0), and an electronic device with a display is located at (0.5 m, 20°, 20°) with respect to a forward-looking direction of the listener. In order to deliver binaural sound that will be perceived as originating from the display of the electronic device, sound could be convolved with a pair of HRTFs corresponding to the location of the electronic device (0.5 m, 20°, 20°). The location of the electronic device, however, is a near-field location with respect to the location of the listener. HRTFs with the near-field location may not be known, may be too process-intensive to convolve with a processor, or may fail to generate reliable audial cues to result in a sound localization point (SLP) for the listener. Instead of processing the sound with the near-field HRTFs, the electronic device selects HRTFs having coordinates that are located at a far-field distance with respect to the listener. For example, the electronic device selects different HRTFs with spherical coordinates of (1.2 m, 20°, 20°). The coordinate location of the different HRTFs occur directly behind a center of the electronic device. Specifically, a distance from the listener to the location to which the different HRTFs correspond is 1.2 m, whereas a distance from the listener to the location of the electronic device is 0.5 m. Further, the location of the coordinates of the different HRTF pair and the location of the coordinates of the electronic device occur on a straight line to a center of the head of the listener (e.g., inside the head of the listener and between his or her ears). Processing the sound with the different HRTFs at the far-field location (as opposed to the near-field location) is less process-intensive and improves the chances of the listener localizing the sound at the sound source. Further, since the location of the coordinate location of the different HRTFs occur directly behind the coordinate location of the electronic device, the listener perceives the sound as originating from the electronic device and not from behind the electronic device.

An example embodiment convolves sound with HRTFs having coordinates that are behind the source of the sound. A distance from the listener to the location of the coordinates of the HRTFs is greater than a distance from the listener to the source of the sound. For example, a processor convolves or processes the sound to originate at a coordinate location that occurs behind a coordinate location of the visible source of the sound. In some instances, the visible source of the sound obstructs a view of the location to where the sound is convolved. For instance, if an image appears on a display and the sound originates from a location behind the display, the listener would not be able to see the location to where the sound is convolved since the display blocks the listener from seeing the location.

Consider an example in which the source of the sound is an electronic device with a display, and the listener sees an image as the visible source of the sound on or through the display. For example, the listener sees a real-time video, a picture, an augmented reality (AR) image, a virtual reality (VR) image, or another object or image that the listener attributes to a sound source. The electronic device, however, is closer than one meter to a face of the listener and, as such, is within a near-field distance from the listener. Instead of convolving the sound with near-field HRTFs, the electronic device convolves the sound with far-field HRTFs. The electronic device selects coordinates of these far-field HRTFs so the location of where the listener hears the sound coming from is behind the electronic device. The location is on a line-of-sight or an imaginary line that extends from the head of the listener to a location where the image is shown on or through the display. The listener observes that the binaural sound originates from the image even though the sound is convolved to a location that is behind the image.

Figure 2:
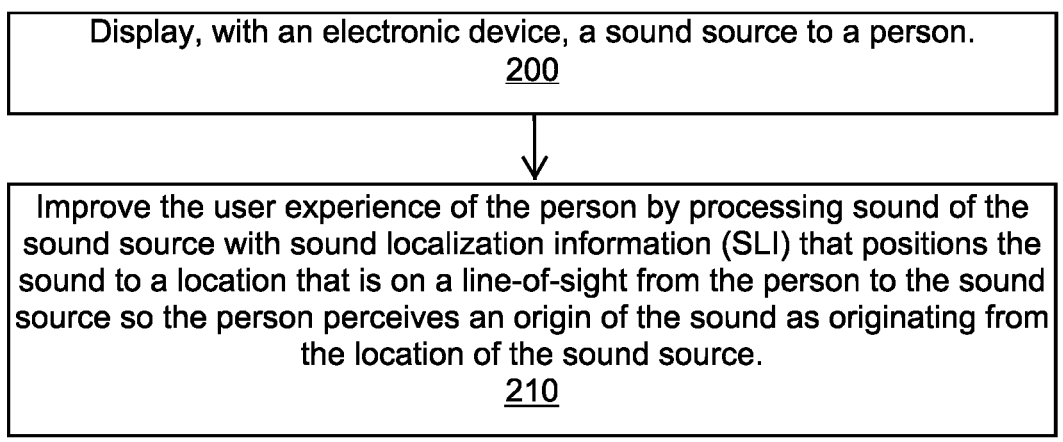
FIG. 2 is a method that improves a user experience while listening to binaural sound that localizes to a sound source in accordance with an example embodiment.

FIG. 2 is a method that improves a user experience while listening to binaural sound that localizes to the sound source.

Block 200 states display, with an electronic device, a sound source to a person.

The electronic device provides or presents the sound source to the person, such as displaying an image on, with, or through a display of the electronic device (see block 100 for further examples).

Block 210 states improve the user experience of the person by processing sound of the sound source with sound localization information (SLI) that positions the sound to a location that is on a line-of-sight from the person to the sound source so the person perceives an origin of the sound as originating from the location of the sound source.

The location where the sound is convolved or positioned is not the location of the sound source. Instead, the location where the sound is convolved is before the sound source or after the sound source and on the line-of-sight from the listener to the sound source.

As noted, in some instances, it may be difficult, undesirable, or impossible to convolve sound to the location of the sound source. In these instances, an example embodiment selects HRTFs with coordinates that exist on an imaginary line that extends from a head of the listener through the sound source. For instance, the imaginary line exists as a line-of-sight when a head of the listener is facing the sound source and the eyes of the listener are looking toward the sound source. As another example, the line extends from a location inside the head of the listener (e.g., between the eyes of the listener) to an image or object representing the sound source. In this instance, the listener is not required to be looking at the sound source, and hence calculations based on a direction where the eyes of the listener are looking are not required. Consider an example in which the listener knows the location or direction of the sound source without actively seeing the sound source (e.g., the listener has already seen the sound source in an earlier field-of-view, the listener anticipates the location of the sound source, the listener has not and/or does not see the sound source but was or is informed of the location of the sound source in another way). The sound is convolved upon an imaginary line in the direction coinciding with the sound source, and hearing the sound positioned on the line produces the perception of the sound originating at the known position of the sound source that is also on the line.

When sound is convolved to originate on or near the line, then the listener is more likely to understand or to comprehend that the sound is attributed to or originates from the position of the sound source. This situation occurs when the sound is convolved to localize on or near the line in front of the sound source or behind the sound source. Thus, two separate optional areas exist that are not located at the location of the sound source and for which HRTF pairs of associated coordinates may be available to execute convolution of the sound. One option is to select HRTFs with coordinates on the line in front of or before the sound source. In this option, the location of the coordinates of the HRTFs is between the face or head of the listener and the sound source. Another option is to select HRTFs with coordinates on the line behind or after the sound source. In this option, the sound source is between the face or head of the listener and the location of the coordinates of the HRTFs.

A processor processes or convolves the sound to originate at a location that is on an imaginary line-of-sight that extends from the listener to the source of the sound. Consider an example in which the source of sound is an image displayed on a display of an electronic device (e.g., a display of a smartphone) or displayed as a VR or AR image with a wearable electronic device. A coordinate location of where the sound is convolved on the line-of-sight is located before the image, at the image, and/or behind the image. As noted, selecting the coordinate location at the image may not be possible, efficient, or desirable. As an alternative, example embodiments select coordinate location(s) before and/or after the image and on the line-of-sight. The sound of the sound source may be convolved to multiple locations along the line simultaneously, emphasizing or highlighting the sound. Highlighting the sound improves the experience of the listener in establishing the direction of the localization and/or identifying the sound source to which the sound is attributed.

An example embodiment convolves the sound to varied locations on the line during the playing of the sound. During the playing of the sound, the example embodiment monitors the response of the listener to the localization in order to establish a best or better location that improves the accuracy of the localization and experience of the listener. For example, for any particular sound that is convolved to localize at $(r, \theta, \varphi)$ on the line extending from the head of the listener, there is an optimal distance R that improves the experience of binaural sound for each listener and each sound source. For example, for some sounds, sound sources or images, listeners, and directions $(\theta, \varphi)$, the optimal value of R may be larger (e.g., improving the positional realism of the experience of the listener in establishing the direction of the localization for sound sources that require accuracy of position) or may be smaller (e.g., increasing the intelligibility or volume of the sound for sound that carries more data such as speech). An example embodiment varies the distance r and gathers active or passive feedback from the listener in order to further adjust r to find the optimal R for each sound source. Finding an optimal R for each source of sound improves the effectiveness of binaural sound in delivering data and/or realism to the listener.

The sound can also be convolved to originate from locations adjacent to or near the line-of-sight. With some sounds, a listener is not able to audibly distinguish between a sound originating exactly from the visible source of the sound (e.g., exactly along the line-of-sight to the image) and a sound originating from a location adjacent to the image or adjacent to the line-of-sight. Sound convolved to a coordinate location sufficiently close to a visible source of the sound can cause the listener to localize the sound at the sound source. Success in altering a localization of a listener depends on several factors, such as distance between the listener and the source of the sound, a loudness of the sound, a type of sound (e.g., whether the sound is familiar or unfamiliar, voice or non-voice), a size of the source of the sound, whether other noise or other sounds are present, and other factors. For example, sound is convolved to originate on the line-of-sight or within a predetermined distance from the line-of-sight.

Consider an example in which a display in an apartment store shows video advertisements. The display has no speakers. Instead, a sound localization system (SLS) wirelessly transmits binaural sound to listeners through electronic earbuds, earphones, or headphones that the listeners wear. As listeners walk near the display, they hear binaural sound originate from the display. In some instances as the listeners walk by, the SLS does not have exact coordinates to convolve sound to originate from a middle or center of the display (for example, the SLS does not have HRTF coordinates corresponding to a center position of the display for a known head orientation of a listener, or an accurate head orientation is unknown). In this situation, the SLS localizes the sound so it appears to originate next to the display, such as on an edge of the display or a few inches from the display. When the listener sees the display, the listener localizes the sound as originating from the location of the display since the audial cues of the binaural sound suggest to the listener a location next to or close to the display.

A volume of the sound can also be adjusted to assist a listener in localizing binaural sound to the sound source when the sound is convolved to a location other than the sound source. For example, an example embodiment convolves sound to have an adjusted volume level that corresponds to the distance from the listener to the visible source of the sound even when the distance to where the sound is convolved is different (such as a distance reaching beyond the visible source of the sound). Adjusting the volume level assists the listener in localizing the sound at the visible source of the sound and not at a different distance.

Consider an example in which a listener telephones a friend on a smartphone that displays a real-time video of the friend during the telephone call. The listener holds the smartphone about one foot away from his face while he talks to his friend and watches the video of his friend. An image of the friend on the display of the smartphone is large and is proportioned to represent a size of the friend as if the friend were standing one foot from the face of the listener. Even though the smartphone is within a near-field distance from the face of the listener, the smartphone executes HRTFs with a far-field location and convolves the voice of the friend to a location that is four feet away from the face of the listener. The location is behind the smartphone and along a line-of-sight from the listener to the smartphone. The smartphone further adjusts a volume of the voice of the friend to coincide with a distance of one foot in front of the face of the listener, not four feet from the face of the listener. The volume thus corresponds to a distance from the listener to the image of the friend and not a distance from the listener to the coordinates to where the smartphone convolves the sound.

Figure 3:
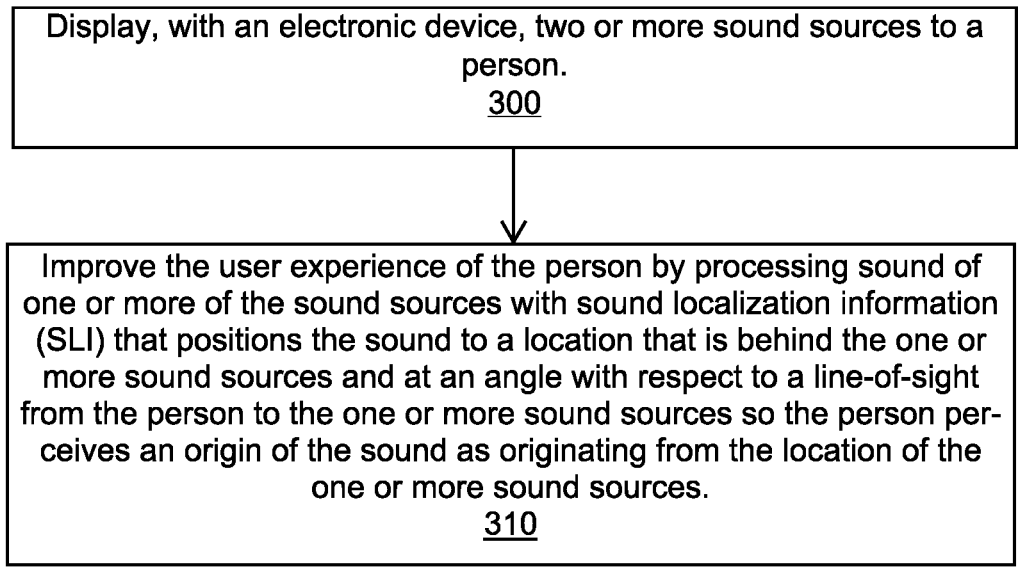
FIG. 3 is a method that improves a user experience while listening to binaural sound that localizes to a sound source in accordance with an example embodiment.

FIG. 3 is a method that improves a user experience while listening to binaural sound that localizes to a sound source.

Block 300 states display, with an electronic device, two or more sound sources to a person.

The electronic device provides or presents the sound sources to the person, such as displaying images on, with, or through a display of the electronic device (see block 100 for further examples).

In an example embodiment, a display of the electronic device is divided, partitioned, or split into two or more portions or windows. Each portion includes an image of one of the sound sources.

Block 310 states improve the user experience of the person by processing sound of one or more of the sound sources with sound localization information (SLI) that positions the sound to a location that is behind the one or more sound sources and at an angle with respect to a line-of-sight from the person to the one or more sound sources so the person perceives an origin of the sound as originating from the location of the one or more sound sources.

Binaural sound includes audial cues to cause a listener to localize the sound to a location that is offset from the line-of-sight of the listener to the sound source. For example in spherical coordinates, the offset has an azimuth angle ($\theta$) and/or an elevation angle ($\varphi$).

Consider an example in which a listener talks with an intelligent user agent (IUA), intelligent personal assistant (IPA), or other computer program on an electronic device with a display. The display simultaneously shows an image representing the IPA or data provided by the IPA and an image of the listener. The listener faces the display with a forward-looking direction between the two images. For instance in spherical coordinates, the listener is located at (0, 0, 0), and a center of the display is located at (0.3 m, 0, 0). An image of the IPA is on a right side of the listener at $+\theta_1$, and an image of the listener is on a left side of the listener at $-\theta_2$ while the listener looks straight ahead with the forward-looking direction. An example embodiment positions or convolves a voice of the IPA to a position behind the electronic device at an angle with a positive azimuth coordinate. For instance, if the forward-looking direction has an azimuth coordinate of $\theta=0°$, then the voice of the IPA is convolved with coordinates within a range of $0°<\theta<30°$ (such as $\theta=5°$, 10°, 15°, 20°, 25°, or) 30°. Further, the voice of the IPA is convolved to coordinates that occur behind the display with a distance (r)>0.3 m. For instance, the voice of the IPA is convolved with HRTF pairs corresponding to spherical coordinates located in the following range: r>1.0 m, $0°<\theta<30°$, and $\varphi=0°$.

One problem in the technological field of binaural sound is that a listener may need to quickly change between listening to sound as binaural sound and listening to the sound as mono sound or stereo sound.

One or more example embodiments solve this problem and provide a quick and convenient way for a listener to change between listening to sound as binaural sound and listening to the sound as mono sound or stereo sound so as to discontinue externalization of the sound.

Figure 4:
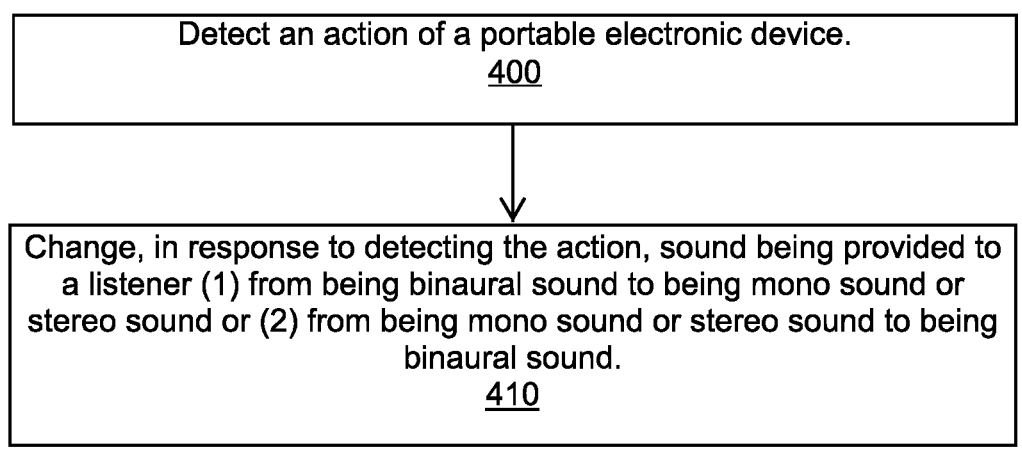
FIG. 4 is a method that detects an action of a portable electronic device and changes sound in response to detection of the action in accordance with an example embodiment.

FIG. 4 is a method that detects an action of a portable electronic device and changes sound in response to detection of the action.

Block 400 states detect an action of a portable electronic device.

The actions include, but are not limited to, one or more of rotating the portable electronic device, moving of the portable electronic device (e.g., shaking the portable electronic device or moving it through the air in a predetermined way), gripping or holding the portable electronic device (e.g., grabbing the portable electronic device with a hand), activity of a person (e.g., sensing when the person is walking or running or sitting), releasing the portable electronic device (e.g., releasing the portable electronic device from a hand), covering a sensor of the portable electronic device (e.g., covering or darkening a lens of a camera), detecting a face of a person (e.g., detecting with facial recognition software the presence or proximity of a person), detecting absences of a face of a person (e.g., detecting with facial recognition software an absence of a face of a person), detecting or sensing light, detecting or sensing darkness, detecting or sensing presence of a person (e.g., with a sensor), detecting or sensing an identity or biometric of a person (e.g., detecting a fingerprint or thumbprint of the person, identifying a person by iris image, retina scan, ear form, or another biometric), detecting a change in an electrical power source of a PED (e.g., changing between battery-supplied power and another source of power), detecting a change in audio output configuring of a PED (e.g., changing from between sound being output from speaker and sound being output from headphones, detecting the an event of headphones being plugged-in or unplugged, coupled to the PED or decoupled, powered on or off), or another action discussed herein.

By way of example, one or more sensors in the portable electronic device detects when the action occurs. For instance, these sensors include, but are not limited to, a camera, a gyroscope, an accelerometer, a magnetometer, a compass, an optical or capacitive scanner, a display, a proximity sensor, a light sensor, a pedometer, a fingerprint sensor, or another sensor.

Block 410 states change, in response to detecting the action, sound being provided to a listener (1) from being binaural sound to being mono sound or stereo sound or (2) from being mono sound or stereo sound to being binaural sound.

The portable electronic device changes or switches sound being provided to the listener in response to detecting the action. Consider an example in which a three-axes accelerometer and/or gyroscope in the portable electronic device senses rotation of the portable electronic device. In response to detecting the rotation, the portable electronic device takes an action with regard to the sound. These actions include changing or switching the sound (1) from being binaural sound to being mono sound or stereo sound or (2) from being mono sound or stereo sound to being binaural sound. Other actions include, but are not limited to, muting the sound, lowering the volume, raising the volume, stopping the sound, ending or terminating a telephone call, placing a telephone call on hold, joining another call, joining another virtual auditory space, muting or pausing or changing a particular sound type or input source, or performing another action.

In an example embodiment, changing from binaural sound to mono sound or stereo sound or changing from mono sound or stereo sound to binaural sound occurs when the portable electronic device detects one or more of a predetermined amount or degree of rotation, a predetermined speed of rotation, and/or rotation in a particular direction or about a particular axis.

Consider an example in which the portable electronic device includes an inertial motion unit (IMU) with an accelerometer, magnetometer, and gyroscope. The IMU senses or detects an amount and/or speed of rotation of the portable electronic device. When the amount of rotation and/or speed of rotation reaches a predetermined threshold, the portable electronic device executes one or more of the actions (e.g., changes the sound from binaural to mono or from mono to binaural).

For example, a listener holds a smartphone in his or her hand and rotates the smartphone by a threshold value of ninety degrees (90°) to change the sound from binaural sound to mono sound. When the listener rotates the phone back (e.g., −90°), the sound changes from mono sound back to binaural sound. Rotation of the smartphone by the threshold value while in the hand of the listener thus provides a convenient way to change between listening to sound in binaural sound and listening to the sound in stereo or mono sound.

Example embodiments are not limited to the threshold value or amount of ninety degrees (90°) since other threshold values or amounts can be designated to trigger a change between binaural sound and mono or stereo sound. By way of example, other threshold values include, but are not limited to, one or more of twenty-five degrees (25°), thirty degrees (30°), thirty-five degrees (35°), forty degrees (40°), forty-five degrees (45°), fifty degrees (50°), fifty-five degrees (55°), sixty degrees (60°), sixty-five degrees (65°), seventy degrees (70°), seventy-five degrees (75°), eighty degrees (80°), eighty-five degrees (85°), ninety degrees (90°), ninety-five degrees (95°), etc.

Consider an example in which a camera in a HPED detects a left and/or right facial profile of a first user during a telephone call or other communication with a second user. An example embodiment positions or repositions where the voice of the second user localizes to the first user in response to detecting the right and/or left facial profile. For example, when the HPED detects a right profile of the listener, the detection triggers a change in the convolution of the voice to a location with an azimuth coordinate (θ) of greater than positive seventy degrees (+70°) and less than positive one hundred degrees (+100°), such that +70°≤θ≤+100° with respect to a line-of-sight of the first user.

Consider an example in which the action of changing sound between binaural sound and mono or stereo sound occurs when the electronic device detects a change in orientation of the electronic device with respect to a face and/or head of the user. When the change reaches or exceeds a threshold value, then execute the change. The change in orientation can occur in one of three ways. First, the orientation of the head and/or body of the user changes with respect to the electronic device while the electronic device does not move. For instance, a user rotates his head or moves with respect to a stationary camera, facing sensor (e.g., front-facing sensor, rear-facing sensor), or other sensor. Second, the orientation of the electronic device changes with respect to the user while the user does not move. For instance, a user holds a smartphone in his or her hand while the camera captures an image of the face and executes facial recognition and distance determination. The user rotates the smartphone so the camera no longer captures the face of the user. Third, both the user and the electronic device move to change the orientation of the user with respect to the electronic device. For instance, the user holds the smartphone in his hand and simultaneously rotates his head and the hand holding the smartphone.

Consider an example in which the action of changing sound from binaural to mono/stereo or from mono/stereo to binaural is triggered when a PED detects rotation of a particular rotational or angular speed of the PED. For example, a listener holds a smartphone in his or her hand and rotates the smartphone slowly and no change is triggered. When the listener rotates the smartphone quickly, a change is triggered. The change is triggered when the rotation occurs within a predetermined time or crosses another threshold, such as a predetermined number of revolutions per second or radians per second. By way of example, a change in the sound is triggered when a quarter rotation or ninety degrees of rotation occurs within a range of 0.1 seconds-0.5 seconds.

Consider an example in which a listener holds a smartphone in front of his face while talking to a friend. The listener sees an image of his friend, and a camera in the smartphone captures an image of the listener that transmits to the friend during the telephone call. A processor (in the smartphone or in a cloud server) processes the voice of the friend in order to be localized as binaural sound at the location of the smartphone in the hand of the listener. When the listener rotates the smartphone ninety degrees downward so the display faces the ground, the voice of the friend changes from being provided to the listener in binaural sound to being provided to the listener in mono sound. When the listener rotates the near edge of the smartphone ninety degrees upwardly so the display again faces the listener, the voice of the friend changes from being provided to the listener in mono sound to being provided to the listener in binaural sound.

Consider an example in which a listener holds a smartphone in front of his face while talking to a friend. The listener hears the voice of the friend as binaural sound that localizes to an image on the display of the smartphone. To switch the voice from being provided in binaural sound that externally localizes to the smartphone to being provided in mono or stereo sound that localizes inside a head of the listener, the listener performs one of the actions discussed herein. As one example, the smartphone changes the sound when a camera in the smartphone ceases or fails to detect a face of the listener. For instance, provide binaural sound only while the camera detects the face of the listener. Change to mono sound or stereo sound when the camera no longer detects the face of the listener. As another example, the smartphone changes the sound when the camera or another sensor detects darkness. For instance, provide binaural sound if the camera or sensor detects a certain level of light. Change to mono sound or stereo sound when the camera or sensor detects an obstruction or a certain drop in the level of light (e.g., the listener puts his or her hand over the sensor or camera; the listener places the smartphone on the table, covering the display or camera; the listener obstructs the display or sensor by placing the smartphone against his or her body, etc.).

Consider an example in which an electronic device captures an image of a person with a camera. The electronic device executes a software application to detect a face and perform facial recognition. During the period of time that the camera detects the face of the person, the electronic device provides sounds to the person as binaural sound. When the camera no longer detects the face of the person, then the electronic device performs an action (such as changing the sound from binaural sound to mono sound or stereo sound, terminating external localization of the sound by the person).

Facial detection and/or facial recognition enables a person to change quickly back and forth between external localization of binaural sound and internal localization of mono or stereo sound. For example, during a telephone call or while playing a software game, a listener holds a HPED (e.g., holds a smartphone in his or her hand) or wears a WED (e.g., wears an electronic watch). A camera in the HPED or WED monitors the face of the listener. When the listener desires to change to mono sound or stereo sound, the listener rotates the HPED or WED so the camera ceases to capture or detect the face of the listener. When the listener desires to change back to externalizing the sound, the listener rotates the HPED or WED so that the camera captures or detects the face of the listener.

Instead of or in addition to rotating the HPED or WED, an example embodiment allows the listener to change the sound between binaural and mono and/or stereo by moving his or her head. A camera in the HPED or WED monitors the face of the listener. The HPED or WED changes the sound when the HPED or WED detects a change in head orientation or a change in gaze of the listener (e.g., the listener looks away from the camera or display or rotates his or her head by a predetermined amount). For instance, the electronic device changes from binaural sound to mono or stereo sound when one of the following occurs and/or changes from mono or stereo sound to binaural sound when one of the following occurs: the listener stops gazing or looking at the display, the listener turns his or her head away from the display, the camera no longer detects the face of the listener, the camera detects a "full face" view, a side profile, a "three-quarter" view, or another view between a "full face" view and a profile of a face of the listener, the camera detects a top of the head of the listener, and the camera detects that the eyes of the listener are closed for a predetermined amount of time.

Consider an example in which two people (e.g., a first person and a second person) talk to each other during a telephone call. Their voices externally localize to each other as binaural sound to images on displays of their respective HPEDs. A camera or facing sensor in the HPED captures and/or detects a face of the person. Convolution is adjusted in response to sensing a change in orientation of a head of a person, such as a change in a profile angle of a face of a person. For example, when the face of the first person is oriented toward the display, then convolve the voice of the second person as binaural sound to the location of or behind the display. When the face of the first person moves to a position exposing a right facial profile to a display of the HPED, the voice of the second person moves. For instance, the HPED moves the voice of the second person from convolving the voice to an azimuth direction (θ) of zero degrees (0°) to convolving the voice to an azimuth direction of positive ninety degrees (+90°) with respect to a facing direction of the head of the first person. When the orientation of the head of the first person relative to a display of the HPED changes to a second relative orientation such that a left facial profile faces a display of the HPED, the voice of the second person moves. For instance, the HPED adjusts the convolution of the voice of the second person such that the first person localizes the voice at a location with an azimuth coordinate (θ) of negative ninety degrees (−90°) with respect to the facing direction of the head of the first person. As the electronic device captures and detects a change in the facial orientation, the example embodiment adjusts the convolution of the voice of the second person so that the first person continues to localize the voice at the electronic device.

An example embodiment improves the user experience of a listener by enabling the listener to find an electronic device, or identify which of multiple electronic devices is the sound source of binaural sound that the listener is hearing and localizing. Consider the example above in which the displays are turned off during a phone call so that images are not displayed at the HPEDs. During the phone call, the electronic devices function as the sound sources rather than the images displayed on or with the electronic devices. The example embodiment determines the orientation of the head of the listener and convolves the sound (here, a voice) to a position on a line extending from the center of the head of the person to and through the HPED of the person. When the orientation of the HPED changes relative to the head of the person receiving the sound, the voice is convolved to a position on a new line extending from the head of the person to and through the HPED of the person. Consider an example where an electronic device monitors the orientation of a head of a listener, and the measurement of the orientation of the head is communicated to or available to other electronic devices that do not monitor head orientation directly.

Consider an example in which a listener wears wireless earphones while walking in a department store. When the listener gazes at a display, a camera detects the face and gaze of the listener. In response to detecting the face, the display plays a content-specific advertisement to the listener. Binaural sound from the advertisement is convolved such that the listener will externally localize the sound at the display. When the listener turns his or her head, the camera detects a change in the orientation of the head of the listener and that the forward looking direction of the listener no longer intersects the display and stops playing the binaural sound to the listener.

Sound can also change between binaural sound and mono or stereo sound when the electronic device detects darkness, detects light, or detects blockage of a sensor. For example, in response to detecting when a lens of a camera is blocked, cease providing sound to a person in binaural sound and commence providing the sound to the person in mono or stereo sound.

Consider an example in which a listener talks to another person during a telephone call while holding a smartphone or other HPED. The listener hears the voice of the other person as binaural sound that localizes at or on the other side of the HPED. The HPED changes to mono or stereo sound upon detecting an action from the user, such as detecting blockage of the camera (e.g., a finger on the lens of the camera), detecting a fingerprint or thumbprint, detecting a finger or thumb on the display, detecting a facial gesture or hand gesture, or detecting another action. Detection of one of these actions enables the listener to change quickly between binaural sound and mono or stereo sound.

Changing between binaural sound and mono or stereo sound can also occur in response to detecting or sensing a change in distance of a listener from an object, such as the electronic device. For example, a camera or facing sensor in a HPED tracks an image or orientation of a person or face of a person during a telephone call. The person hears the voice of the other person during the telephone call in binaural sound. The HPED automatically switches or changes the voice from externally localizing in binaural sound to localizing in one of mono or stereo sound when the person moves a predetermined distance from the HPED. For instance, change the sound when the person moves more than one meter away from a present position or from the HPED, more than 1.5 meters away, more than 2.0 meters away, etc. A camera or sensor captures an image or orientation of the head of the person, and the distance of the person or head from the HPED is determined based on a size of the face and/or body image captured or sensed with the camera or sensor.

Consider an example embodiment that monitors states of a PED providing sound to a listener and changes the sound in response to change in a state. For example, a listener without headphones hears sound from a single speaker included in the body of a PED. The listener couples or plugs-in headphones to the PED for private listening. Alternatively, the listener commences to listen with wireless headphones that communicate with the PED. The example embodiment detects the change in the audio output device from the speaker to the headphones. The detection of the change of output device triggers the example embodiment to begin convolution of the sound, now being output to the headphones. One or more processors (such as a processor in the PED or in communication with the PED) convolves the sound so it externally localizes to the listener as originating at the speaker at the PED. As such, the listener hears the sound as originating from the speaker of the PED even though the speaker is not actually generating the sound anymore. The listener experiences little or no change in localization of the sound between hearing the sound from the speaker and through the air, to hearing the sound through headphones and convolved to a position at the PED or behind the sound source or PED.

Consider further this example in which the listener wears headphones and hears binaural sound that originates from the PED. After some time, the voltage level of the PED drops below a predetermined threshold and a power state of the PED changes to "low battery." The change in state triggers the example embodiment to discontinue convolution of the sound to binaural sound and instead to continue to play the sound output to the headphones in mono sound. Ceasing to execute processes and/or hardware that convolve the sound preserves battery power. This process conservation also improves the performance of the PED by prolonging the duration of the powered-on state of the PED. Further, changing of the sound from binaural sound that externally localizes to the listener to mono sound also improves the experience of the listener by serving as an alert to the listener of the "low battery" state of the PED.

FIGS. 5-8 show example embodiments with various electronic devices, such as a TV or display, HPED, WED, HMD, OHMD, wireless earphones or headphones. Example embodiments, however, are applied with other types of electronic devices as well.

FIGS. 5A-5H show a listener 500 interacting with a handheld portable electronic device (HPED) 510 to change sound between being provided in binaural sound and being provided in mono or stereo sound. The listener hears the sound through an electronic device 520, such as headphones, earphones, earbuds, or OHMD. Each figure includes a sound localization point (SLP) 530A-530H shown as an enlarged asterisk (*) that illustrates from where the listener hears the sound as originating. For illustration, the listener 500 is using the HPED 510 to communicate with a user (e.g., talking with a person, an IPA, an IUA, a bot, or a computer program). For example, the communication occurs during a telephone call or voice exchange with the user. The SLP thus represents an origin of the voice of the user to the listener (e.g., a spot where the voice of the user is heard by the listener to originate).

Figure 5A:
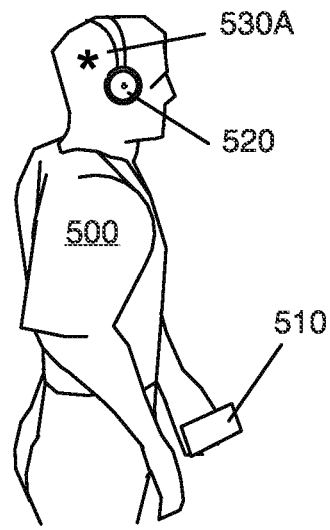
FIGS. 5A-5H show a listener interacting with a handheld portable electronic device (HPED) to change sound between being provided in binaural sound and being provided in mono or stereo sound in accordance with an example embodiment.

In FIG. 5A, the listener 500 hears the voice of the user in mono or stereo sound through the electronic device 520, and the SLP 530A is located inside a head of the listener 500. For example, the listener 500 receives or initiates a telephone call with the user through the HPED 510, and the listener hears the voice of the user in a conventional way as mono or stereo sound through the electronic device 520.

Figure 5B:
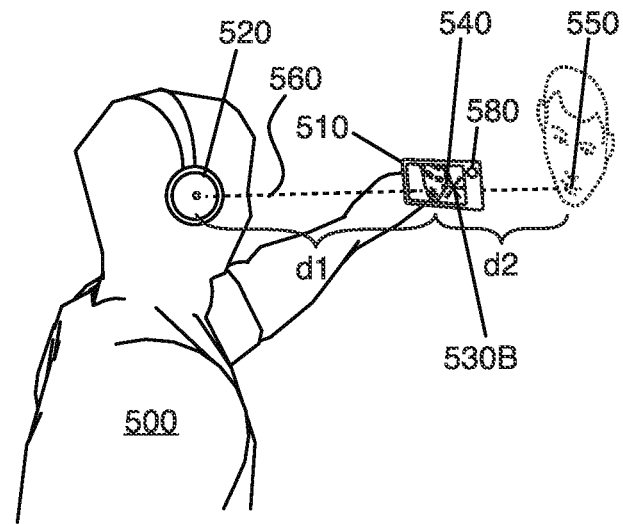

In FIG. 5B, the listener 500 hears the voice of the user in binaural sound through the electronic device 520, and the SLP 530B is externally located outside the head of the listener 500. The HPED 510 displays an image 540 of the user, and the image 540 is the sound source to the listener. The listener 500 perceives or believes the voice of the user originates from the image 540 that is being displayed on the display of the HPED. The HPED, however, is not emanating sound through its speakers since the voice of the user is being provided to the listener 500 through the electronic device 520 worn on the head of the listener.

In FIG. 5B, a processor (such as a processor in the HPED 510) convolves the voice of the user to a coordinate location 550 that is behind the HPED 510. For illustration, the coordinate location 550 is shown as an image of a head of the user. The coordinate location 550 is located on a line-of-sight 560 that extends from the head or face of the listener 500, through the image 540 on the display of the HPED, and to the coordinate location 550.

When the listener 500 holds the HPED 510 in his or her hand and in front of his or her face (FIG. 5B), a distance from the head of the listener 500 to the HPED 510 is a near-field distance (d1). The coordinate location 550, however, is located a distance (d2) away from the HPED 510 in order to be at a far-field distance from the listener 500. As such, the distance of the coordinate location 550 from the head of the listener 500 is greater than or equal to one meter: d1+d2≥1.0 m.

Consider an example in which the HPED 510 is a smartphone, and the listener 500 in FIG. 5B holds the smartphone one foot in front of his face (e.g., d1=1.0 ft). The smartphone has a spherical coordinate location of (1.0 ft, 0°, 0°) with respect to the head of the listener 500 at the origin. In order for the listener to localize a voice of the user to the smartphone, near-field HRTFs could be selected to have coordinates that match the spherical coordinate location of the smartphone (e.g., select an HRTF pair corresponding to a coordinate location of (1.0 ft, 0°, 0°). As explained herein, convolving sound with such near-field HRTFs can be problematic. Instead of using these near-field HRTFs, an example embodiment instead selects far-field HRTF pairs. For example, the smartphone selects far-field HRTFs that have a spherical coordinate location of (3.2 ft, 0°, 0°). The voice of the user is convolved to a location that is behind the smartphone (e.g., convolved to coordinate location 550). The listener 500 will hear the voice of the user as if originating from the location of the smartphone since the coordinate location 550 is aligned with the image 540.

In the example of the HPED being a smartphone, the listener may perceive a discrepancy between the location of the image 540 and the location of the coordinate location 550. For instance, the listener localizes the voice of the user to the coordinate location 550 but sees the image 540 of the user at a closer location where the smartphone is located.

The discrepancy is relatively minor, and further minimized for small values of d2. One way to minimize or eliminate the discrepancy is to place the coordinate location 550 on the line-of-sight 560. Convolving the voice along the line-of-sight reduces or eliminates a discrepancy in localization between the percept of the image 540 at a distance of d1 and a binaural sound convolved to a different coordinate location 550.

Figure 5C:
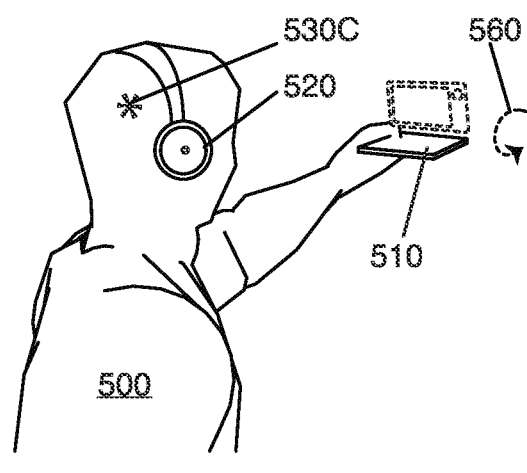
Figure 5D:
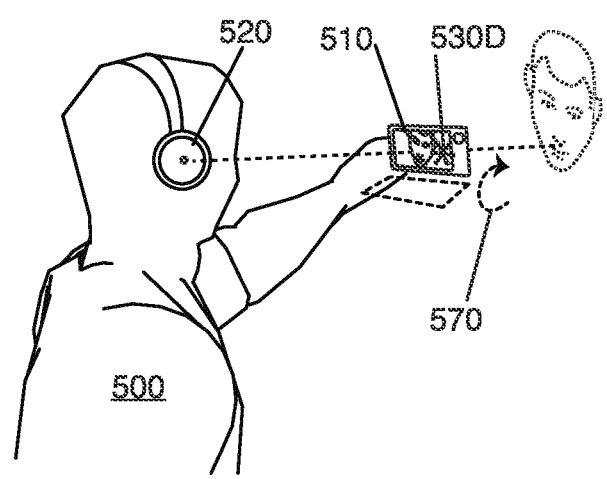

FIGS. 5C and 5D show examples of how the listener 500 easily and quickly switches between hearing the sound as binaural sound and hearing the sound as mono or stereo sound.

In FIG. 5C, the listener 500 flicks or rotates the HPED 510 from a first position (shown in dashed lines with a display facing toward the face and/or head of the listener) to a second position (shown in solid lines with a display facing the ground or away from the face and/or head of the listener). The rotation is shown with arrow 560. After the HPED 510 rotates per arrow 560, the sound localizes to the listener as mono or stereo sound inside his or her head at the SLP 530C. When the HPED detects or senses the rotation, sound changes from being provided as binaural sound to being provided as mono or stereo sound.

In FIG. 5D, the listener 500 flicks or rotates the HPED 510 from a first position (shown in dashed lines as facing the ground or away from the face and/or head of the listener) to a second position (shown in solid lines as facing the face and/or head of the listener). The rotation is shown with arrow 570. After the HPED 510 rotates per arrow 570, the listener localizes the sound as binaural sound outside his or her head at the SLP 530D. When the HPED detects or senses the rotation, sound changes from being provided as mono or stereo sound to being provided as binaural sound.

Figure 5E:
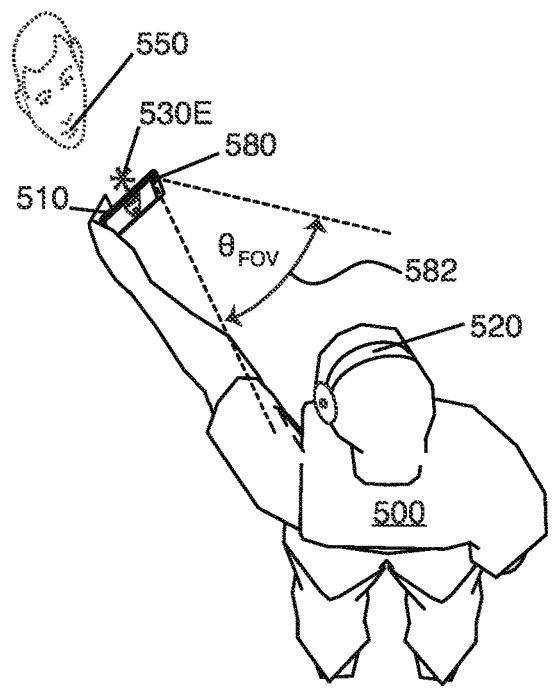
Figure 5F:
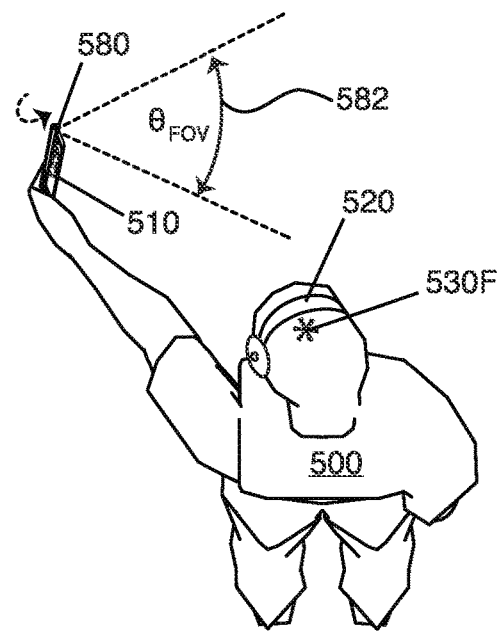
Figure 5G:
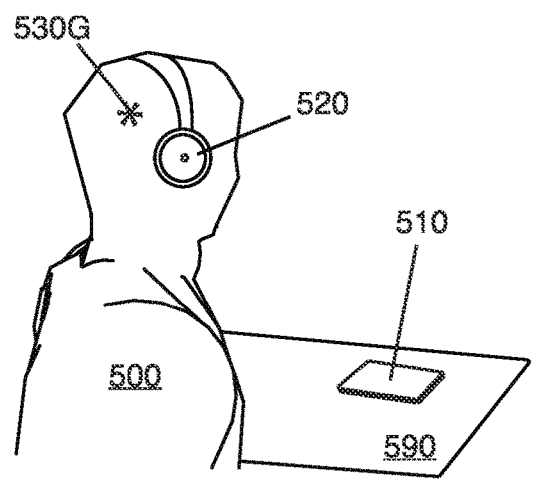

FIGS. 5E-5G show more examples how the listener 500 easily and quickly switches between hearing the sound as binaural sound and hearing the sound as mono or stereo sound.

In FIG. 5E, the facing sensor or camera 580 captures an image of the face of the listener 500. The listener continues to localize the binaural sound externally to the HPED at SLP 530E as long as the face of the listener 500 remains in a field-of-view (FOV) 582 of the camera. FIG. 5E shows the listener rotating the HPED 510 by an azimuth angle (θ). As the listener rotates the HPED within the FOV 582, he or she continues to localize the sound to the SLP 530E while the sound continues to be convolved to the coordinate location 550 that is behind the HPED.

FIG. 5F shows the listener 500 rotating the HPED 510 so the face of the listener is outside the FOV 582 of the facing sensor or camera 580. The movement causes the sound to change from being provided to the listener as binaural sound to being provided to the listener as mono or stereo sound. When the HPED detects or senses that the face of the listener is no longer in the FOV of the camera, sound changes from being provided as binaural sound to being provided as mono or stereo sound. The listener now localizes the sound as mono or stereo sound to the SLP 530F located inside the head of the listener.

In FIG. 5G, the sound switches between binaural sound and mono or stereo sound when the HPED is placed onto or removed from an object 590 (such as a table or other surface). For example, when the HPED 510 is placed on the object 590, the display, camera, or other sensor is covered, obstructed, or darkened. Sensing the placement or the action of the placement triggers the processor to change how the sound is convolved and/or how the sound is provided to the listener. For instance, in response to sensing the HPED being placed on the object 590, change the sound from being provided to the listener as binaural sound to being provided as mono or stereo sound. The listener now localizes the mono or stereo sound to the SLP 530G located inside the head of the listener. When the listener retrieves or removes the HPED from the object 590, the sound changes from being provided as mono or stereo sound to being provided as binaural sound that externally localizes to the listener.

Figure 5H:
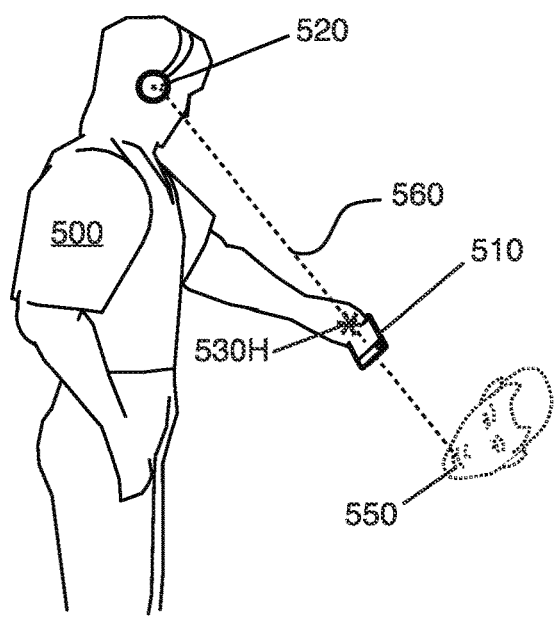

FIG. 5H shows that the coordinate location 550 remains behind the HPED 510 and on the line-of-sight 560 as the listener 500 moves the HPED while communicating with the user. For example, the listener moves the HPED from the position shown in FIG. 5B to the position shown in FIG. 5H. The origination point of the voice of the user thus tracks the position of the HPED as the listener holds the HPED in his or her hand and moves the HPED to different locations. The listener hears the voice of the user as binaural sound at or near 530H as if the voice were originating from or emanating from the location of the HPED when in fact the listener hears the voice of the user through the electronic device 520.

As the listener moves the HPED during the communication with respect to his or her face or head orientation, the sound localization information (SLI) processing the voice of the user changes. For example, the processor convolves or processes the voice of the user with new or different sets of HRTFs in order to change the coordinate location 550 so that it remains behind the HPED relative to the user during the communication.

SLPs 530B, 530E, and 530H appear at, slightly behind, and slightly in front of the sound source at the HPED 510. This illustrates that a listener may not localize a SLP to an exact coordinate location. A listener associates the sound convolved to location 550 with the visible HPED 510 and the association results in the listener localizing the convolved sound at the area occupied by the sound source. The SLP may not have a precise coordinate location, the SLP can vary depending on the circumstances such as the type of sound, the auditory environment, the sensitivity of the listener, the visibility of the sound source, a distance from the listener to the sound source, and other factors.

An example embodiment determines a gaze direction or looking direction of the listener independent of the orientation of the head of the listener. For example, a gaze tracker or detector, facing sensor or other sensor monitors the gaze angle of the listener, or a camera captures an image of the face of the listener and the image is analyzed to determine the direction that the listener is looking. The example embodiment selects HRTF pairs for coordinates that intersect or coincide with a line extending from the head of the listener in the direction of the gaze or the looking direction. The listener hears the sound convolved such that the sound appears to originate from the direction that the listener is looking.

Consider an example where the sound is convolved to a point on the other side of a sound source (such as a HPED and/or other objects) and does not localize to the listener unless the gaze angle of the listener intersects with the sound source. The listener hears the sound externally localized when the listener looks at the sound source, such as the HPED or other object. When the gaze angle is not directed to the sound source then the sound of the sound source is paused, muted, or played without being externally localized (e.g., the sound is provided to the listener as mono sound or stereo sound).

Consider a similar example in which the listener hears localizations of binaural sounds at or beyond one or more sound sources while the gaze of the listener is not toward the sound source. When the gaze is detected as being toward a sound source, the sound of the sound source is switched to mono sound or stereo sound, paused, muted, or adjusted in another way. This allows the listener to focus on a particular sound source by looking at the sound source. While looking at the sound source, the sound source localizes in his or her head, while other sound sources continue to externalize out and away from the listener.

Consider an example in which the listener holds the HPED in front of his or her face during the communication at spherical coordinate location (r, θ, φ) of (0.3 m, 0°, 0°). A processor processes the voice with HRTFs corresponding to coordinates (1.0 m, 0°, 0°) so the voice of the user localizes for the listener on the far side of the HPED from the listener. The listener then rotates his or her head on the vertical or longitudinal axis by negative twenty degrees (θ=−20°). In response to the change in head orientation, the processor convolving the voice of the user retrieves a new HRTF pair corresponding to coordinates (1.0 m, +20°, 0°) and processes the voice of the user with the new HRTF pair. The voice of the user continues to localize to the listener as if from the HPED.

Consider an example in which a person holds a HPED in his or her hand and is on a telephone call with another user. The HPED includes a camera that captures an image of the person and also includes a display that displays an image of the user as the sound source. A facial recognition and/or head tracking system monitor a head orientation of the person during the telephone call. When the person changes his or her head orientation by or beyond a predetermined amount or threshold amount, the voice of the user that the person hears changes from binaural sound to mono sound or from mono to binaural. For example, the HPED changes the voice of the user from binaural sound to sound that the person localizes inside his or her head in response to the HPED detecting a predetermined change in the head orientation. For example, the change of the orientation of the head is relative to the HPED such as an azimuth angle change due to head rotation on a vertical axis of the head and/or a change in the pitch angle of the head resulting from head rotation on the frontal axis of the head. For instance, the predetermined amount or threshold includes rotation in one or more axes by one or more of twenty-five degrees (25°), thirty degrees (30°), thirty-five degrees (35°), forty degrees (40°), forty-five degrees (45°), fifty degrees (50°), fifty-five degrees (55°), sixty degrees (60°), sixty-five degrees (65°), seventy degrees (70°), seventy-five degrees (75°), eighty degrees (80°), eighty-five degrees (85°), or ninety degrees (90°). These predetermined amounts or thresholds are applied to other example embodiments as well.

Figure 6A:
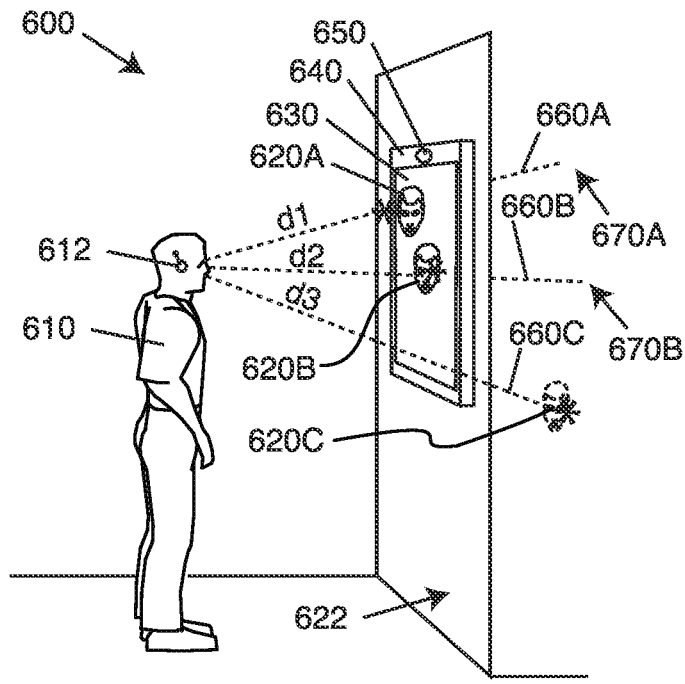
FIGS. 6A and 6B show an electronic or computer system in which a listener hears voices from three different users whose voices localize externally to the listener as binaural sound to three different images on a display of an electronic device in accordance with an example embodiment.
Figure 6B:
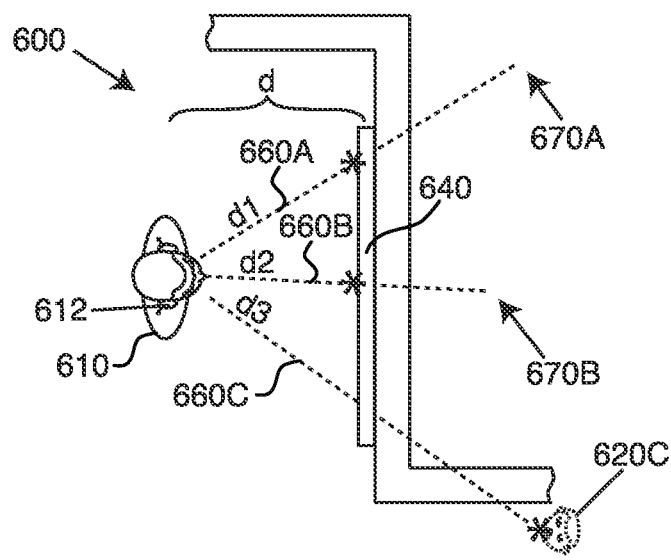

FIGS. 6A and 6B show an electronic or computer system 600 in which a listener 610 hears voices from three different users whose voices localize externally to the listener 610 as binaural sound to three different images 620A, 620B, and 620C on a display 630 of an electronic device 640. The listener wears an electronic device 612 (e.g., wireless earphones, wireless headphones, a HMD, or OHMD) that wirelessly communicate with the electronic device 640 to hear the voices as binaural sound. By way of example, the three different users are people engaged in a telephone call with the listener 610, images displayed during an advertisement, or computer programs (e.g., an IPA, IUA, bot, characters in a computer game, independent processes or tasks, windows, etc.). The electronic device 640 is shown as a flat display but includes different types of displays and electronic devices, such as a television (TV), a curved display, an edge display, a 3D TV, a projector and projection, a virtual display, etc.

The electronic device 640 includes a sensor 650 that determines one or more of a presence or existence of a person or avatar, a distance to a person or avatar, a gaze or looking direction of a person or avatar, a voice of a person or avatar, a facing direction of a person or avatar, and gestures of a person or avatar. For example, the sensor 650 is a motion sensor, presence sensor, camera, proximity sensor, infrared sensor, facing sensor, a virtual sensor, a position of a VR camera or virtual point-of-view (POV), etc.

The listener 610 sees each image 620A, 620B, and 620C along a respective line-of-sight 660A, 660B, and 660C while the listener stands a near-field distance (d) from the display 630. The listener, however, perceives the images at different distances with respect to the listener. Images 620A and 620B appear to be located at the surface of the display 630. Image 620C, however, appears to be located farther away than a wall or virtual wall 622 at which the display 630 is located. For example, the perception of the greater distance to image 620C is created by the display 630 being a display that provides for the viewer a perception of distance or 3D space (e.g., a 3D TV or display, a HMD, a display showing stereoscopic video or images). A distance (d1) from the listener 610 to the location of the image 620A is a near-field distance. A distance (d2) from the listener 610 to the location of the image 620B is a near-field distance. A distance (d3) from the listener 610 to the location of the image 620C is a far-field distance.

Since distances d1 and d2 are near-field distances, voices of the users corresponding to images 620A and 620B are convolved with HRTFs having coordinate locations 670A and 670B that are far-field distances. Since distance d3 is a far-field distance, the voice of the user corresponding to image 620C is convolved with a HRTF pair having a distance coordinate that matches or corresponds to the far-field distance of d3. The listener perceives a voice at image 620A at its location on the display 630 even though the voice is convolved with HRTFs of coordinate location 670A. The listener perceives a voice at image 620B at its location on the display 630 even though the voice is convolved with HRTFs of coordinate location 670B. The listener perceives a voice at image 620C at its location behind or beyond the display 630 where the listener visually localizes the image 620C and where the sound is convolved to originate. Coordinate locations 670A and 670B are behind wall 622.

Figure 7:
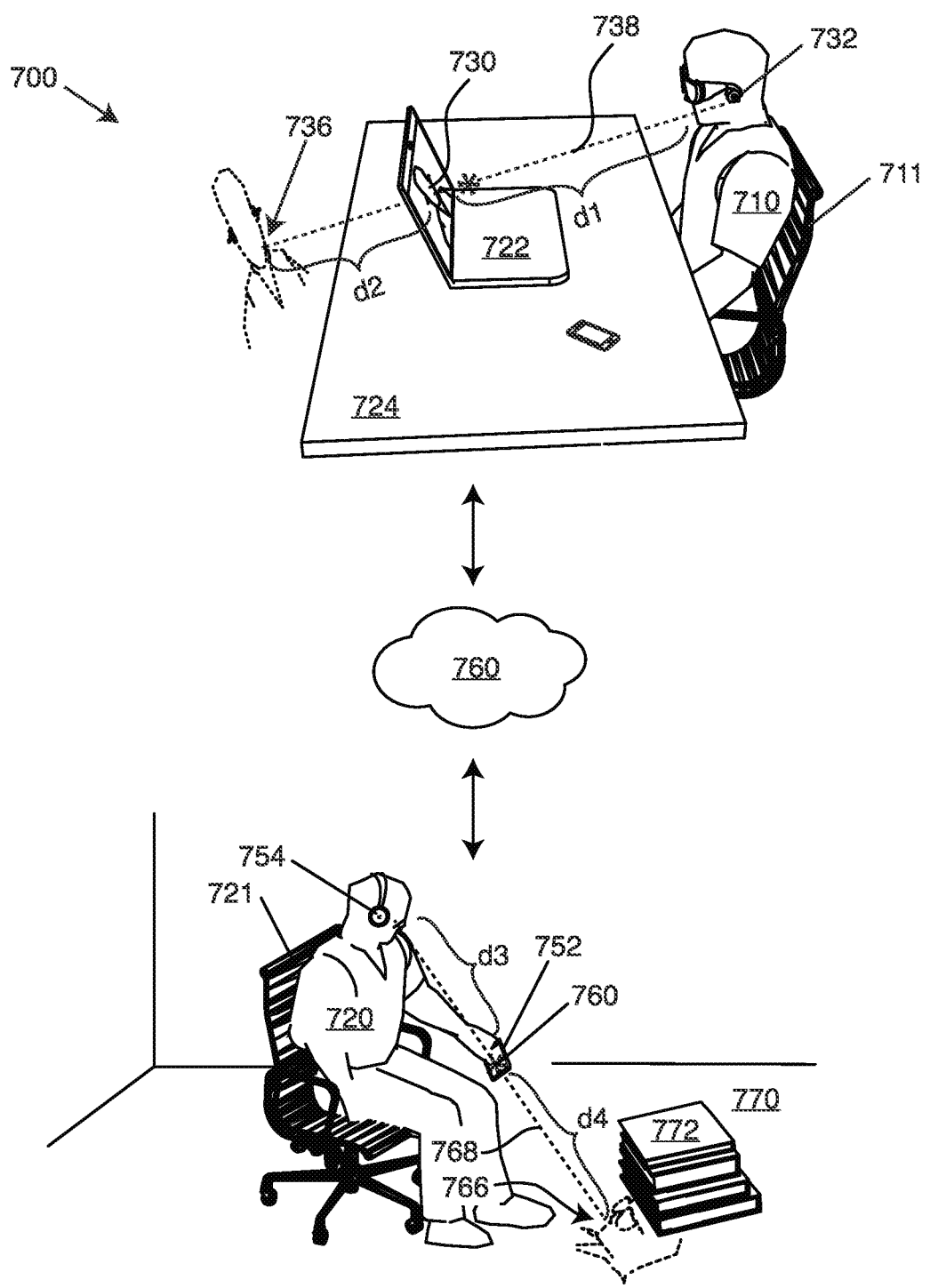
FIG. 7 shows an electronic or computer system in which two listeners are engaged in a telephone call in accordance with an example embodiment.

FIG. 7 shows an electronic or computer system 700 in which two listeners 710 and 720 are engaged in a telephone call in accordance with an example embodiment.

Listener 710 sits in a chair 711 with a laptop computer 722 resting on a table 724 while the listener 710 talks to listener 720. An image 730 of the listener 720 appears on the display of the laptop computer 722. The listener 710 hears a voice of the listener 720 through headphones or earphones 732 that wirelessly communicate with the laptop computer 722.

A voice of the listener 720 localizes to the listener 710 as binaural sound that is heard to emanate from or originate from the image 730 on the display of the laptop computer 722. A processor (e.g., a processor in the laptop computer 722 or elsewhere in the computer system 700) processes the voice of the listener 720 with HRTFs for coordinate location 736 that is behind the laptop computer 722.

The coordinate location 736 is on a line-of-sight 738 that extends from a head of the listener 710 to the image 730 displayed on the laptop computer 722. The coordinate location 736 is shown in empty space behind the laptop computer 722. A distance (d1) from the head of the listener 710 to the image 730 is a near-field distance that is less than one meter. A distance (d1+d2) from the head of the listener 710 to the coordinate location 736 is a far-field distance that is one meter or more. As such, the processor processes or convolves the voice of the listener 720 with far-field HRTFs even though the image 730 where the listener perceives the origination of the voice is located at a near-field distance with respect to the listener 710.

Listener 720 talks to listener 710 while listener 720 sits in a chair 721 with a smartphone 752 in a hand of the listener in front of his or her face. An image 760 of the listener 710 appears on the display of the smartphone 752. The listener 720 hears a voice of the listener 710 through headphones or earphones 754 that wirelessly communicate with the smartphone 752. The smartphone 752 wirelessly communicates with the laptop computer 722 over one or more networks 760 while the listeners 710 and 720 are remote from each other at different geographical locations.

A voice of the listener 710 localizes to the listener 720 as binaural sound perceived by listener 720 as emanating from or originating from the image 760 on the display of the smartphone 752. A processor (e.g., a processor in the smartphone 752 or elsewhere in the computer system 700) processes or convolves the voice of the listener 710 with HRTFs having a coordinate location 766 that is behind the smartphone 752. The coordinate location 766 is located on a floor 770 located next to a stack of books 772 in a room where the listener 720 is located.

The coordinate location 766 is on a line-of-sight 768 that extends from the listener 720 to the image 760 displayed on the smartphone 752. A distance (d3) from a head of the listener 720 to the image 760 is a near-field distance that is less than one meter. A distance (d3+d4) from the head of the listener 720 to the coordinate location 766 is a far-field distance that is one meter or greater. As such, the processor processes or convolves the voice of the listener 710 with far-field HRTFs even though the image 760 where the voice is perceived is located at a near-field distance with respect to the listener 720.

Figure 8A:
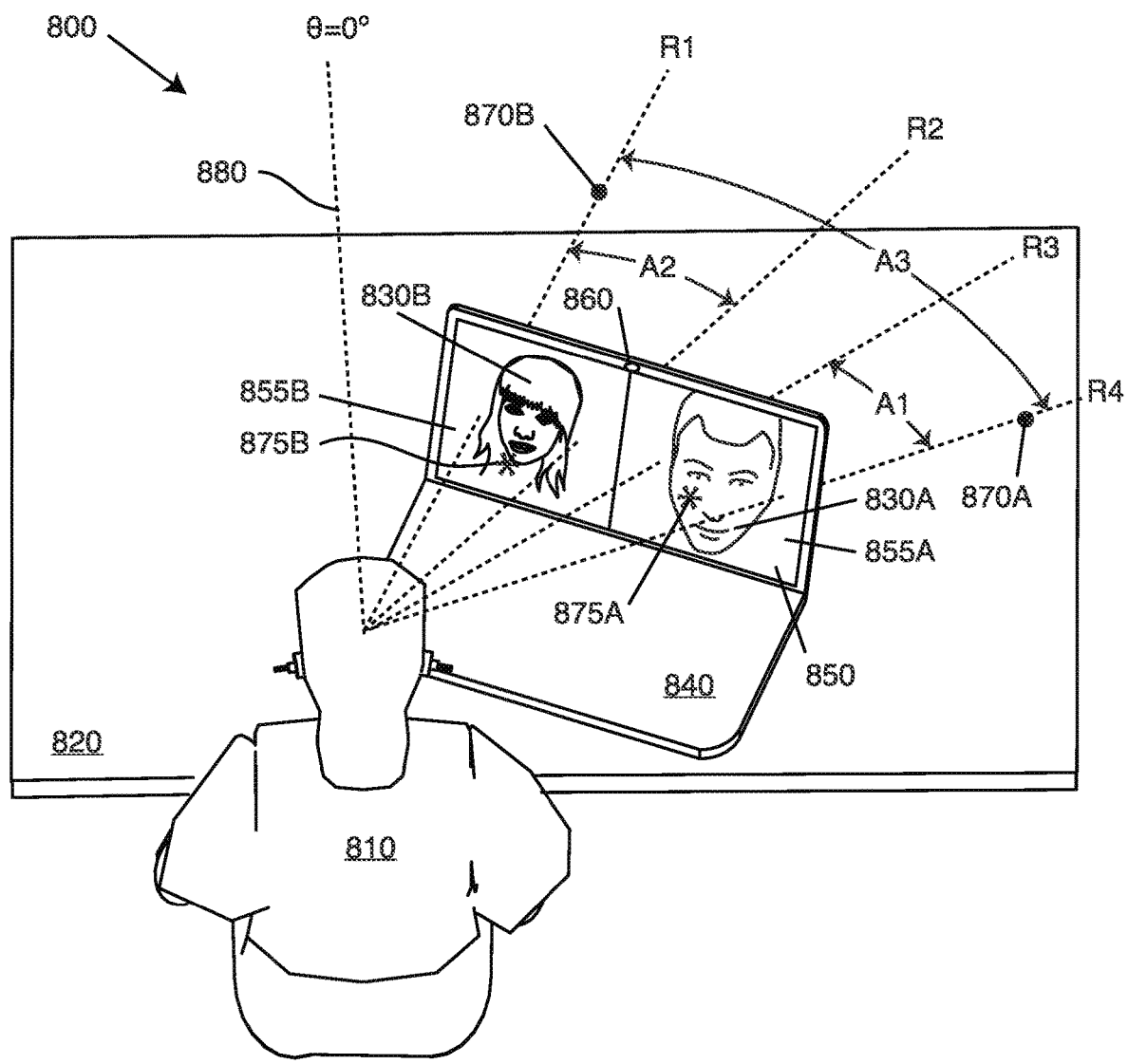
FIGS. 8A and 8B show an electronic or computer system in which a listener sits at a table and engages in a telephone call or other type of communication with two users via a portable electronic device in accordance with an example embodiment.
Figure 8B:
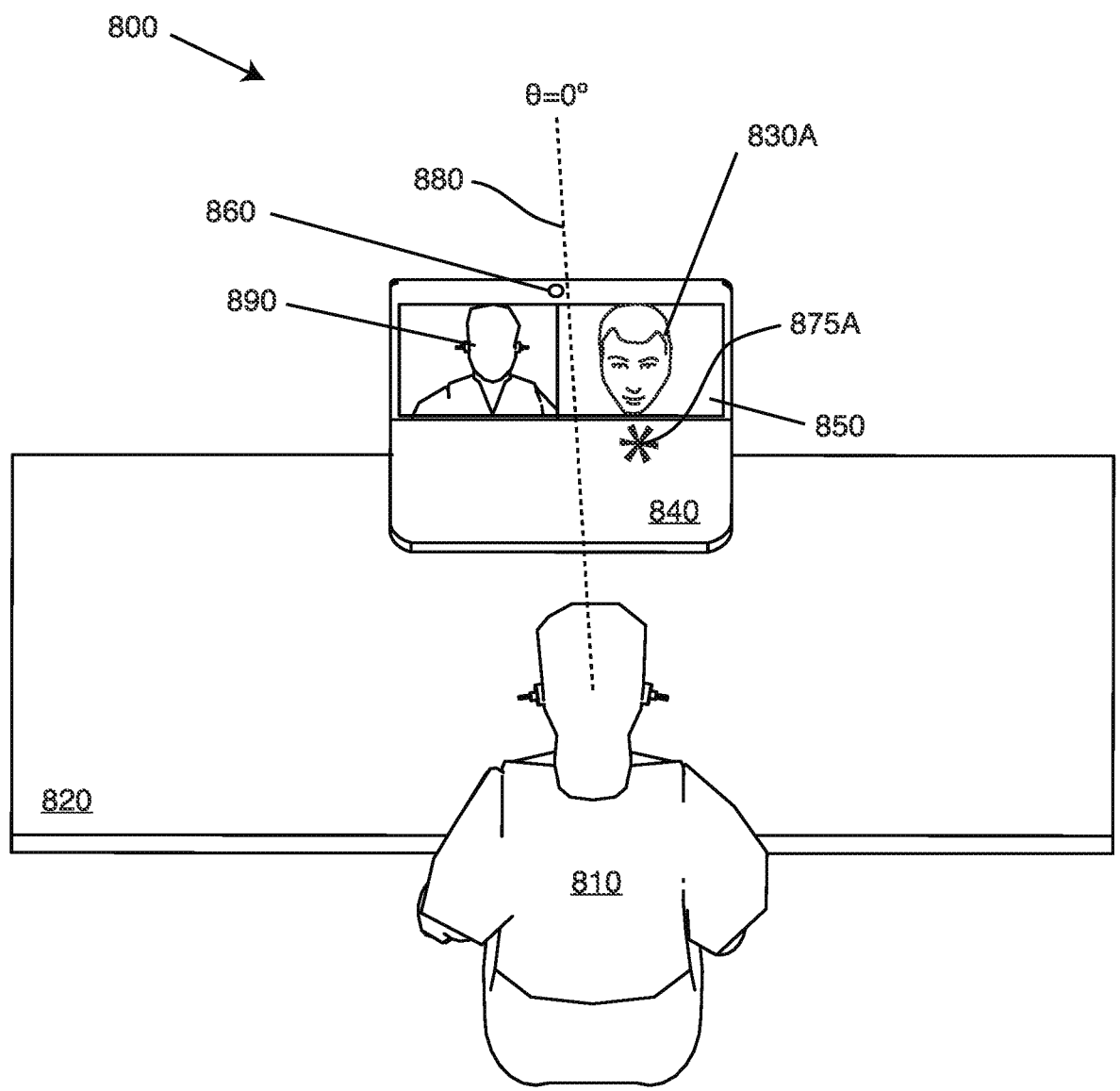

FIGS. 8A and 8B show an electronic or computer system 800 in which a listener 810 sits at a table 820 and engages in a telephone call or other type of communication with two users via a portable electronic device 840. Images 830A and 830B of the two users appear on a display 850 of the portable electronic device 840 while the listener 810 talks to the users. The images 830A and 830B of the two users move and interact with the listener 810 in real-time. For example, the images are software programs or people with whom the listener 810 talks. For instance, the users are people and the images 830A and 830B are real-time video of the users during a conference call. As another example, one user is a person and one user is a bot; the images of both users are avatars; and the avatars are visually perceived by listener 810 as two-dimensional or three-dimensional AR images in a 3D environment of the listener (e.g., using stereoscopic video, holograms, light fields, or another type of display or projection).

The display 850 is divided into two halves or two sections 855A and 855B. Section 855A displays image 830A, and section 855B displays image 830B. This situation occurs, for example, when the listener 810 talks with two different users. Example embodiments include a listener engaging in visual telephony with a different number of other users, such as a single user, three users, ten users, twenty users, or another number of users. Each user may be presented as an image and/or a section or area of a display or other location (including AR and VR images).

A camera 860 in the portable electronic device 840 captures an image of the listener 810 and provides the image and/or video to one or more of the users. Further, the camera 860 and one or more software programs perform other functions, such as detect and recognize a face of the listener 810, determine or monitor a presence of the listener 810, determine a distance of the face of the listener from the display 850, determine an angle of the face of the listener or an orientation of the head of the listener 810 relative to the camera 860 and/or relative to the display 850 of the electronic device 840, and perform other functions discussed herein.

The listener 810 is located a near-field distance from the display 850 of the electronic device 840. HRTFs having near-field distance coordinates may not be available or desirable for convolution of the voices of the users for the listener in a near-field range. Instead, an example embodiment convolves the voices with HRTFs having far-field distance coordinates. The coordinate locations of these HRTFs fall beyond or behind the display 850 of the electronic device 840.

A processor processes or convolves the voice of each user with a different pair of HRTFs so the voices are not heard to overlap or localize from a coincident or matching location during the communication. For example, the processor convolves the voice corresponding to image 830A with HRTFs having a coordinate location at 870A and convolves the voice of image 830B with HRTFs having a coordinate location at 870B. These locations are separated from each other on opposite sides of azimuth angle A3 having a vertex at the head of the listener. Coordinate locations 870A and 870B are shown to exist in empty space behind the display 850 of the electronic device 840 with respect to the location of the head of the listener 810.

The listener 810 hears a voice from image 830A as binaural sound that originates from a location 875A. The location 875A corresponds to or matches the location of the image 830A on the display 850 relative to the orientation of the head of the listener. The listener 810 hears a voice at image 830B as binaural sound originating from location 875B. Location 875B corresponds to or matches the position of the image 830B on the display 850 as heard by the listener 810.

The listener 810 has a forward-looking direction off to the side of the display 850 with a line-of-sight 880 along $\theta=0°$. The voice of a user is convolved with HRTFs included within a range of coordinate locations that provide for the binaural sound to be rendered behind the respective image of the user (here image 830A or 830B) and behind the display 850 relative to the head of the listener 810.

Rays R1-R4 extending from the head of the listener 810 and angles A1-A3 having vertices at the head of the listener 810 are shown to illustrate example ranges for azimuth coordinates of HRTF pairs. The voice or other sound of a user is convolved with an HRTF pair having an azimuth coordinate within the range of the angle occupied by the image or display section corresponding to the user. Convolving the voice with an HRTF pair within the azimuth range allows the listener 810 to externally localize the voice or other sound of a user such that the listener experiences the binaural sound as originating at the image of the user. Ray R1 has an azimuth coordinate of $\theta1$. Ray R2 has an azimuth coordinate of $\theta2$. Ray R3 has an azimuth coordinate of $\theta3$. Ray R4 has an azimuth coordinate of $\theta4$. Angle A1 has sides R3 and R4. Angle A2 has sides R1 and R2. Angle A3 has sides R1 and R4. As such the size of angle A1 is the difference of θ4 and θ3, the size of angle A2 is the difference of θ2 and θ1, and the size of angle A3 is the difference of θ4 and θ1.

To localize the sound corresponding to image 830A, an example embodiment selects HRTF pairs having azimuth angle coordinates between θ3 and θ4. Here, θ4 is greater than θ3 and less than or equal to the azimuth coordinate of location 870A. The azimuth angle of ray R4 and of coordinate location 870A represents the alignment of a right-side edge or boundary of image 830A from the POV of the head of the listener 810 that has a forward-facing orientation of θ=0°. The azimuth angle of ray R3 represents the alignment of a left-side edge or boundary of image 830A with respect to the head of the listener. The listener 810 observes the image 830A within the angle A1. The listener 810 hears the sound of the voice of a user originating from within the angle A1 and from the image 830A when the voice is convolved with a HRTF pair having an azimuth coordinate θ such that θ3≤θ≤θ4. For example, location 870A has an azimuth coordinate equal to θ4 and so the voice of the user shown as 830A is convolved with a HRTF pair corresponding to location 870A, and localizes to the listener at image 830A (e.g., 875A).

Sound is convolved behind image 830B by HRTFs with an azimuth angle in the range between θ1 and θ2 or interior to the angle A2. Ray R1 represents an edge or boundary for where the image 830B is seen by the listener from the head orientation of forward facing ray 880. An opposite edge or boundary of the image 830B as seen by the listener with the head oriented toward θ=0° is represented by ray R2. The azimuth angle of coordinate location 870B is a value between or included by the azimuth angle coordinate of ray R1 and ray R2. As such, the listener 810 perceives sound convolved to location 870B as emanating from the image 830B such as from point 8758.

The images 830A and 830B of the users appear close beside each other on the display 850. The voices of the users, however, are convolved to distant points 870A and 870B on opposite sides of angle A3 that are farther apart than the images of the users. This improves the user experience by preventing the listener from localizing the two voices as overlapping and assists the listener in spatially distinguishing the two sound sources from each other.

For ease of illustration azimuth angles of FIG. 8A are shown and discussed herein. Example embodiments also similarly calculate elevation coordinates in order to select HRTF pairs that are aligned with the image or sound source from the point of view of the head of the listener. The example embodiments select elevation angles from those that fall between a ray that bounds a lower edge of an image, area of a display, or sound source and a ray that bounds an upper edge of an image, area of display, or sound source (the rays having endpoints at the head of the listener).

Providing HRTFs with a range of different azimuth (and/or elevation) angles solves a technical problem and assists in convolving the voices of the users. For example, HRTFs corresponding to coordinate location 870A may not be available. In this situation, other HRTFs are selected that correspond to coordinate locations with an azimuth angle interior of angle A1 (i.e., behind the display). Likewise, HRTFs having coordinate locations corresponding to the location of 870B may not be available. In this situation, HRTFs with other coordinate locations could be selected as long as the selected coordinate locations are aligned with the image 830B (e.g., with an azimuth angle within angle A2). Thus the objective of assisting the listener to localize a voice of a user at the image or sound source representing the user can be achieved with multiple different HRTF pairs.

In FIG. 8B, the listener 810 has changed the position of the portable electronic device (PED) 840 to be directly in front of the listener. The HRTF pairs convolving the sound of the users have been updated to compensate for the change in the distance to and orientation of the head of the listener 810 relative to the images of the users displayed on the display 850. For example, the changes in the relative position of the head are determined by analyzing the facial profile angle from one or more images or video captured by the camera 860, or by resolving head movement reported by a head tracking system with the movement of the PED 840 as reported by sensors of the PED. The user being represented by image 830B terminates or ceases the communication with the listener 810. The image 830B is replaced with an image 890 of the listener 810. The camera 860 captures an image of the listener 810, and the electronic device 840 displays the image 890 on the display 850. During the communication, the listener 810 simultaneously sees a real-time image 890 of himself or herself and a real-time image 830A of the other user.

Figure 9:
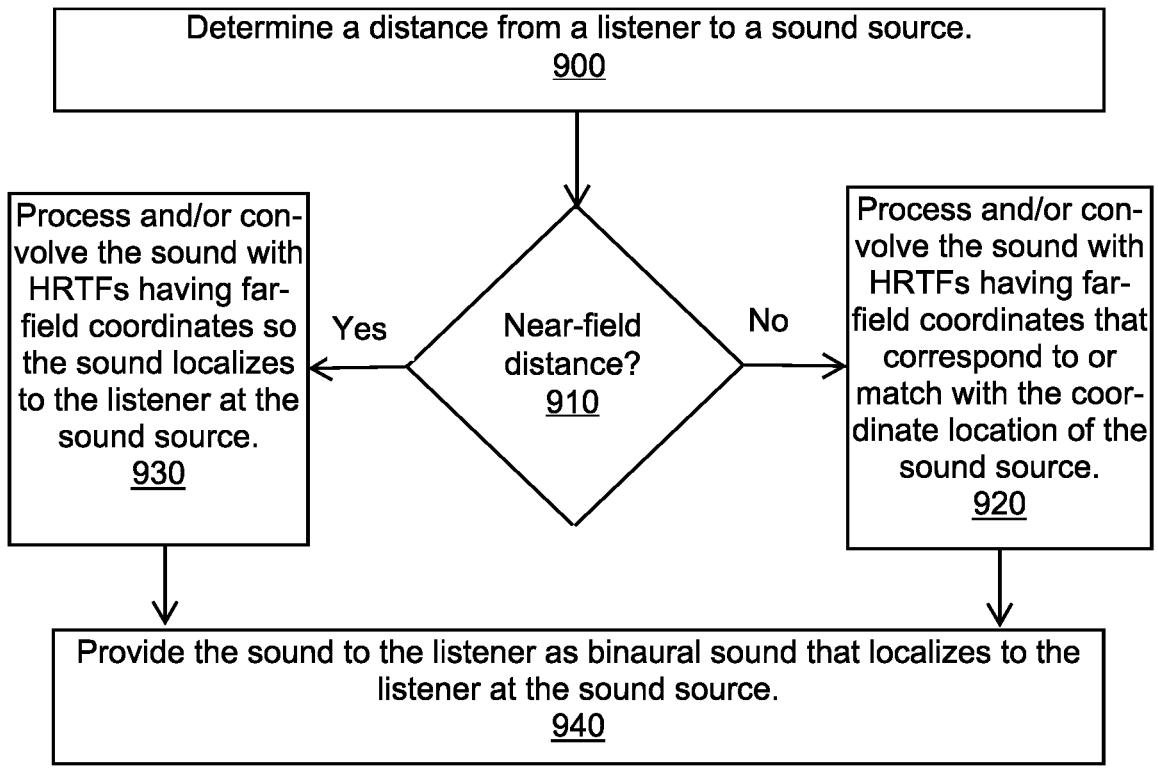
FIG. 9 is a method that selects HRTFs based on a distance of a listener from a sound source in accordance with an example embodiment.

FIG. 9 is a method that selects HRTFs based on a distance of a listener from a sound source in accordance with an example embodiment.

Block 900 states determine a distance from a listener to a sound source.

One or more electronic devices or sensors of an electronic device determine a distance from the listener to the sound source. By way of example, the sensors include one or more of a camera, a proximity sensor, ultrasonic sensor, a radio frequency identification (RFID) tag and reader, laser, light source sensor, or other sensor that assists in determining a distance of an object from an electronic device.

The distance can represent the distance from the listener to an electronic device (e.g., an electronic device representing the sound source), to a display (e.g., a flat or curved display displaying the sound source), to an AR image rendering to a listener as though in the physical environment, to a VR image in a virtual environment, or to another sound source.

As an example, a camera at the location of the sound source captures an image of a face of a listener and executes an algorithm to determine a distance of the face from the camera. For example, triangle similarity can be used to determine distance from the camera to a known object (e.g., a face) based on a size of the head and/or face of the captured image. For instance, a distance (D) to the face is a function of a known width of the face (WF) times the focal length (FL) of the camera divided by the width of the pixels (WP). As another example, a facial recognition can be used to determine distance from the camera to the known object (e.g., a face) based on distances between one or more facial landmarks (e.g., eyes, nose, mouth, etc.).

As another example, a camera that is in communication with the electronic system captures an image that includes both the listener and the sound source that are away from the camera. The electronic system then uses the image to determine the life-scale distance between the listener and sound source included in the image. For example, image recognition software determines an angle and distance from the camera to the listener (side A of a triangle) and an angle and distance from the camera to the sound source (side B of the triangle). An algorithm executing in the electronic system sums the two angles to determine the vertex angle at the camera between the listener and the sound source (i.e., between side A and side B). The algorithm then uses the law of cosines to calculate the distance between the listener and the sound source (i.e., side C of the triangle).

As another example, the listener wears a HPED (e.g., a smartphone) or wearable electronic device (e.g., a HMD) that displays an AR or VR image of the sound source rendered to be perceived at a particular distance with respect to an origin, such as a location of the wearer. A distance from the listener to the sound source is based on a relative size of the image being displayed or a location or virtual location to where the image is being rendered. For instance, the image is displayed at a real or virtual chair that is observed as two feet away from the wearer of the electronic device.

As another example, the listener wears electronic earphones or headphones that communicate with the HPED or other electronic device that displays the sound source. Communication between these two electronic devices establishes a distance from the listener wearing the electronic earphones or headphones and a sound source at the HPED or other electronic device.

As another example, software and/or hardware that positions, displays, and/or monitors locations of virtual objects in VR or AR is queried for and/or reports the distance between a head or virtual head of the listener and a sound source.

Block 910 makes a determination as to whether the distance is a near-field distance.

A near-field distance is a distance less than one meter. A far-field distance is a distance greater than or equal to one meter.

If the answer to the determination is "no" then flow proceeds to block 920 that states process and/or convolve the sound with HRTFs having far-field coordinates that correspond to or match with the coordinate location of the sound source. For example, the determined distance from the listener to the sound source matches or equals a distance from the listener to the coordinate location corresponding to the HRTF pair being executed to convolve the sound.

A processor (such as a digital signal processor or DSP) processes the sound with SLI (including a pair of HRTFs). The HRTFs have a coordinate location that matches, approximates, or corresponds to a location of the sound source.

If the answer to the determination is "yes" then flow proceeds to block 930 that states process and/or convolve the sound with HRTFs having far-field coordinates so the sound localizes to the listener at the sound source.

A processor (such as a digital signal processor or DSP) processes the sound with SLI (including a pair of HRTFs). The HRTFs have a coordinate location that does not match, approximate, or correspond to a location of the sound source. For example, the HRTFs have a coordinate location that is away from or farther than the location of the sound source. For instance, the HRTFs have spherical coordinates with a distance (r) coordinate that is larger than or greater than the distance from the listener to the sound source.

An example embodiment executes one or more of the following so the sound localizes to the listener at the sound source when the HRTFs have a coordinate location that does not match the location of the sound source: convolve the sound to a location on, near, along, or about the line-of-sight from the listener to the sound source, convolve the sound to a location that is behind or beyond the sound source, convolve the sound to a location that is behind or beyond the electronic device providing or displaying the sound source (e.g., an image of the sound source), and convolve the sound to have a volume or loudness commensurate with the distance from the listener to the sound source (as opposed to the distance from the listener to the coordinate location of the HRTFs).

By way of example, the sound localization information (SLI) are retrieved, obtained, or received from memory, a database, a file, an electronic device (such as a server, cloud-based storage, or another electronic device in the computer system or in communication with a PED providing the sound to the user through one or more networks), etc. For instance, the information includes one or more of HRTFs, ILDs, ITDs, and/or other information discussed herein. Instead of being retrieved from memory, this information can also be calculated in real-time.

An example embodiment processes and/or convolves sound with the SLI so the sound localizes to a particular area or point with respect to a user. The SLI required to process and/or convolve the sound is retrieved or determined based on a location of a desired SLP or the sound source. For example, if the SLP is to be located one meter in front of a face of the listener and slightly off to a right side of the listener, then an example embodiment retrieves the corresponding HRTFs, ITDs, and ILDs and convolves the sound to this location. The location can be more specific, such as a precise spherical coordinate location of (1.2 m, 25°, 15°), and the HRTFs, ITDs, and ILDs are retrieved that correspond to the location. For instance, the retrieved HRTFs have a coordinate location that matches or approximates the coordinate location where sound is desired to originate to the user. Alternatively, the location is not provided but the SLI is provided (e.g., a software application provides to the DSP HRTFs and other information to convolve the sound).

A central processing unit (CPU), processor (such as a DSP), or microprocessor processes and/or convolves the sound with the SLI, such as a pair of head related transfer functions (HRTFs), ITDs, and/or ILDs so that the sound will localize to a zone or SLP. For example, the sound localizes to a specific point (e.g., localizing to point (r, θ, φ)) or a general location or area (e.g., localizing to far-field location (θ, φ) or near-field location (θ, φ)). As an example, a lookup table that stores a set of HRTF pairs includes a field/column that specifies the coordinates associated with each pair, and the coordinates indicate the location for the origination of the sound. These coordinates include a distance (r) or near-field or far-field designation, an azimuth angle (θ), and/or an elevation angle (φ).

The complex and unique shape of the human pinnae transforms sound waves through spectral modifications as the sound waves enter the ear. These spectral modifications are a function of the position of the source of sound with respect to the ears along with the physical shape of the pinnae that together cause a unique set of modifications to the sound called head related transfer functions or HRTFs. A unique pair of HRTFs (one for the left ear and one for the right ear) can be modeled or measured for each position of the source of sound with respect to a listener.

A HRTF is a function of frequency (f) and three spatial variables, by way of example (r, θ, φ) in a spherical coordinate system. Here, r is the radial distance from a recording point where the sound is recorded or a distance from a listening point where the sound is heard to an origination or generation point of the sound; δ (theta) is the azimuth angle between a forward-facing user at the recording or listening point and the direction of the origination or generation point of the sound relative to the user; and φ (phi) is the polar angle, elevation, or elevation angle between a forward-facing user at the recording or listening point and the direction of the origination or generation point of the sound relative to the user. By way of example, the value of (r) can be a distance (such as a numeric value) from an origin of sound to a recording point (e.g., when the sound is recorded with microphones) or a distance from a SLP to a head of a listener (e.g., when the sound is generated with a computer program or otherwise provided to a listener).

When the distance (r) is greater than or equal to about one meter (1 m) as measured from the capture point (e.g., the head of the person) to the origination point of a sound, the sound attenuates inversely with the distance. One meter or thereabout defines a practical boundary between near-field and far-field distances and corresponding HRTFs. A "near-field" distance is one measured at about one meter or less; whereas a "far-field" distance is one measured at about one meter or more. Example embodiments are implemented with near-field and far-field distances.

The coordinates for external sound localization can be calculated or estimated from an interaural time difference (ITD) of the sound between two ears. ITD is related to the azimuth angle according to, for example, the Woodworth model that provides a frequency independent ray tracing methodology. The coordinates (r, θ, φ) for external sound localization can also be calculated from a measurement of an orientation of and a distance to the face of the person when a head related impulse response (HRIR) is captured.

The coordinates can also be calculated or extracted from one or more HRTF data files, for example by parsing known HRTF file formats, and/or HRTF file information. For example, HRTF data is stored as a set of angles that are provided in a file or header of a file (or in another predetermined or known location of a file or computer readable medium). The data can include one or more of time domain impulse responses (FIR filter coefficients), filter feedback coefficients, and an ITD value. This information can also be referred to as "a" and "b" coefficients. By way of example, these coefficients are stored or ordered according to lowest azimuth to highest azimuth for different elevation angles. The HRTF file can also include other information, such as the sampling rate, the number of elevation angles, the number of HRTFs stored, ITDs, a list of the elevation and azimuth angles, a unique identification for the HRTF pair, and other information. The data can be arranged according to one or more standard or proprietary file formats, such as AES69, and extracted from the file.

The coordinates and other HRTF information are calculated or extracted from the HRTF data files. A unique set of HRTF information (including r, θ, φ) is determined for each unique HRTF.

The coordinates and other HRTF information are also stored in and retrieved from memory, such as storing the information in a look-up table. The information is quickly retrieved to enable real-time processing and convolving of sound using HRTFs and hence improves computer performance of execution of binaural sound.

The SLP represents a location where a person will perceive an origin of the sound. For an external localization, the SLP is away from the person (e.g., the SLP is away from but proximate to the person or away from but not proximate to the person). The SLP can also be located inside the head of the person (e.g., when the sound is provided as mono sound or stereo sound).

A location of the SLP corresponds to the coordinates of one or more pairs of HRTFs, or corresponds to a coordinate location or zone where a listener perceives a localization due to the influence of a visual cue (e.g., an image, object, or device), or a known or understood location of a sound source that is not visible (e.g., a recently witnessed or anticipated location of a sound source, a device that is out of a field-of-view, an avatar suddenly occluded by another virtual object).

For example, the coordinates of or within a SLP or a zone match or approximate the coordinates of a HRTF. Consider an example in which the coordinates for a pair of HRTFs are (r, θ, φ) and are provided as (1.2 meters, 35°, 10°). A corresponding SLP or zone intended for a person thus includes (r, θ, φ), provided as (1.2 meters, 35°, 10°). In other words, the person will localize the sound as occurring 1.2 meters from his or her face at an azimuth angle of 35° and at an elevation angle of 10° taken with respect to a forward-looking direction of the person. In the example, the coordinates of the SLP and HRTF match.

As another example, a listener perceives a SLP at a sound source of a near-field physical object and the HRTFs convolving the perceived sound have far-field coordinates along the line-of-sight from the head of the listener to the object. In this case, one or more of the SLP coordinates do not match the coordinates of the object (e.g., the r coordinates do not match). HRTF pairs having coordinates matching the coordinates of the object may be unavailable to the listener. Later as the listener localizes the sound to the object, a barrier is placed such that the listener is blocked from seeing the object. The listener continues to localize the sound to the object, with the object as the SLP because the listener remains aware that the object has not moved.

The listener turns around 180° so that the sound source is behind the listener, and an example embodiment updates the azimuth coordinate of the HRTFs by 180°. Though the object is outside of the field of view of the listener, the listener continues to localize the sound to the location of the object that is behind the listener. The listener having witnessed and associated the sound with the object remains aware of the source of the sound and continues to localize the sound to the location or area of the object.

SLI can also be approximated or interpolated based on known data or known SLI such as SLI for other coordinate locations. For example, a SLP is desired to localize at coordinate location (2.0 m, 0°, 40°), but HRTFs for the location are not known. HRTFs are known for two neighboring locations, such as known for (2.0 m, 0°, 35°) and (2.0 m, 0°, 45°), and the HRTFs for the desired location of (2.0 m, 0°, 40°) are approximated from the two known locations. These approximated HRTFs are provided to convolve sound to localize at the desired coordinate location (2.0 m, 0°, 40°).

Sound is convolved either directly in the time domain with a finite impulse response (FIR) filter or with a Fast Fourier Transform (FFT). For example, an electronic device convolves the sound to one or more SLPs using a set of HRTFs, HRIRs, BRIRs, or RIRs and provides the person with binaural sound.

In an example embodiment, convolution involves an audio input signal and one or more impulse responses of a sound originating from various positions with respect to the listener. The input signal is a limited length audio signal (such as a pre-recorded digital audio file) or an ongoing audio signal (such as sound from a microphone or streaming audio over the Internet from a continuous source). The impulse responses are a set of HRIRs, BRIRs, RIRs, etc.

Convolution applies one or more FIR filters to the input signals and convolves the input signals into binaural audio output or binaural stereo tracks. For example the input signals are convolved into binaural audio output that is specific or individualized for the listener based on one or more of the impulse responses to the listener.

The FIR filters are derived binaural impulse responses that are executed with example embodiments discussed herein (e.g., derived from signals received through microphones placed in, at, or near the left and right ear channel entrance of the person). Alternatively or additionally, the FIR filters are obtained from another source, such as generated from a computer simulation or estimation, generated from a dummy head, retrieved from storage, etc. Further, convolution of an input signal into binaural output can include sound with one or more of reverberation, single echoes, frequency coloring, and spatial impression.

Processing of the sound also includes calculating and/or adjusting an interaural time difference (ITD), an interaural level difference (ILD), and/or other aspects of the sound in order to alter the cues and artificially alter the point of localization. Consider an example in which the ITD is calculated for a location (θ, φ) with discrete Fourier transforms (DFTs) calculated for the left and right ears. The ITD is located at the point for which the function attains its maximum value, known as the argument of the maximum or arg max as follows:

$$ITD = \mathrm{argmax}(\tau) \sum_n d_{l,\theta,\phi}(n) \cdot d_{r,\theta,\phi}(n+\tau).$$

Subsequent sounds are filtered with the left HRTF, right HRTF, and/or ITD so that the sound localizes at (r, θ, φ). Such sounds include filtering stereo and monaural sound to localize at (r, θ, φ). For example, given an input signal as a monaural sound signal s(n), this sound is convolved to appear at (θ, φ) when the left ear is presented with:

$$s_l(n) = s(n-ITD) \cdot d_{l,\theta,\phi}(n);$$

and the right ear is presented with:

$$s_r(n) = s(n) \cdot d_{r,\theta,\phi}(n).$$

Consider an example in which a dedicated digital signal processor (DSP) executes frequency domain processing to generate real-time convolution of monophonic sound to binaural sound.

By way of example, a continuous audio input signal x(t) is convolved with a linear filter of an impulse response h(t) to generate an output signal y(t) as follows:

$$y(\tau) = x(\tau) \cdot h(\tau) = \int_0^\infty x(\tau - t) \cdot h(t) \cdot dt.$$

This reduces to a summation when the impulse response has a given length N and the input signal and the impulse response are sampled at t=iDt as follows:

$$y(i) = \sum_{j=0}^{N-1} x(i-j) \cdot h(j).$$

Execution time of convolution further reduces with a Fast Fourier Transform (FFT) algorithm and/or Inverse Fast Fourier Transform (IFFT) algorithm.

Consider another example of binaural synthesis in which recorded or synthesized sound is filtered with a binaural impulse response (e.g., HRIR or BRIR) to generate a binaural output sound to the person. The input sound is pre-processed to generate left and right audio streams that are mapped to one or more sound sources or sound localization points (known as SLPs). These streams are convolved with a binaural impulse response for the left ear and the right ear to generate the left and right binaural output sound signal. The output sound signal is further processed depending on a final destination. For example a cross-talk cancellation algorithm is applied to the output sound signal when it will be provided through loudspeakers or applying artificial binaural reverberation to provide 3D spatial context to the sound.

Example embodiments designate or include an object, sound source, image, or device on the ray that extends from a head of a listener to the intended SLP (such as displaying an image as the sound source at or in line with the intended SLP). For an external localization, the SLP is away from the person (e.g., the SLP is away from but proximate to the person or away from but not proximate to the person). The SLP can also be located inside the head of the person (e.g., when sound is provided to the listener in stereo or mono sound).

Block 940 states provide the sound to the listener as binaural sound that localizes to the listener at the sound source.

Binaural sound is provided to the listener through one or more electronic devices including, but not limited to, one or more of bone conduction headphones, speakers of a wearable electronic device (e.g., headphones, earphones, electronic glasses, earbuds, head mounted display, smartphone, etc.). Binaural sound can be processed for crosstalk cancellation and provided through other types of speakers (e.g., dipole stereo speakers).

From the point-of-view of the listener, the sound originates or emanates from the object, point, area, or location that corresponds with the SLP. For example, an example embodiment selects an intended SLP at, on, or near a physical object, a VR object, or an AR object that is or represents the sound source (including locations behind the object or sound source). When the sound is convolved with HRTFs corresponding to the intended SLP (including HRTFs behind the intended SLP), then the sound appears to originate to the listener at the object.

When binaural sound is provided to the listener, the listener will hear the sound as if it originates from the sound source. The sound, however, does not originate from the sound source since the sound source may be an inanimate object with no electronics or an animate object with no electronics. Alternatively, the sound source has electronics but does not have the capability to generate sound (e.g., the sound source has no speakers or sound system). As yet another example, the sound source has speakers and the ability to provide sound but is not providing sound to the listener. In each of these examples, the listener perceives the sound to originate from the sound source, but the sound source does not produce the sound. Instead, the sound is altered or convolved and provided to the listener so the sound appears to originate from the sound source.

Sound localization information (SLI) is stored and categorized in various formats. For example, tables or lookup tables store SLI for quick access and provide convolution instructions for sound. Information stored in tables expedites retrieval of stored information, reduces CPU time required for sound convolution, and reduces a number of instruction cycles. Storing SLI in tables also expedites and/or assists in prefetching, preprocessing, caching, and executing other example embodiments discussed herein.

Consider an example in which a HPED determines an identity of a listener (e.g., with a biometric sensor such as one discussed herein) and retrieves HRTFs associated with the identified listener. For example, a HPED captures, with a camera in the HPED, the face of a first user during telephony with a second user. Facial recognition software analyzes the facial image of the first user to determine his or her identity. Memory stores HRTFs for different users (e.g., personalized HRTFs or preferred HRTFs). Based on the identity of the user, the HPED retrieves far-field HRTFs that are assigned to the first user. A processor in the HPED or a process in a server in communication with the HPED convolves the voice of the second user with the selected far-field HRTFs. When the camera no longer detects or recognizes the face of the first user, the HPED changes the voice of the second user from localizing as the binaural sound to localizing as one of mono sound or stereo sound.

In an example embodiment, the HRTFs and SLI being executed to convolve the sound can switch or change depending on whether the distance of the listener to the sound source is near-field or far-field. Consider an example in which a display displays a sound source to a listener who is two meters away from the sound source. When the listener is two meters away from the sound source, the listener is a far-field distance from the sound source. The example embodiment convolves the sound with far-field HRTFs with coordinate locations that correspond to the location of the sound source. The coordinate locations of the SLI correspond or match the coordinate locations of the sound source. The listener then moves closer to the sound source and is within a near-field distance to the sound source, say within 0.5 meters of the sound source. Instead of convolving the sound to the location of the sound source which would require near-field HRTFs, an example embodiment switches or changes convolution to convolve the sound to a location that is behind the sound source so far-field HRTFs can continue to be used to convolve the sound. For example, the example embodiment selects far-field HRTFs with a distance of 1.0 meters and adjusts the SLI accordingly. The sound is actually convolved with SLI to coordinates located 1.0 meters away from the listener which would be 0.5 meters behind the sound source. The listener, though, perceives the sound as originating from the sound source even though the coordinate locations of the HRTFs do not match the coordinate location of the sound source (e.g., here, the HRTFs have a distance of 1.0 meters while the sound source has a distance of 0.5 meters from the listener). This example illustrates one way in which convolution of the sound changes based on a distance of the listener to the sound source. The example embodiment continues to convolve the sound with far-field HRTFs even when the listener is a near-field distance to the sound source.

Figure 10:
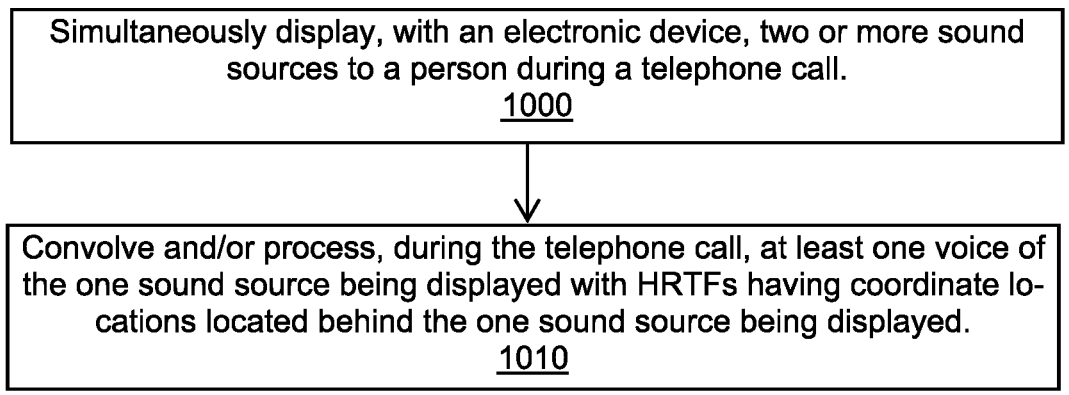
FIG. 10 is a method that convolves, during a telephone call, a voice of a sound source to a location behind the sound source in accordance with an example embodiment.

FIG. 10 is a method that convolves, during a telephone call, a voice of a sound source to a location behind the sound source in accordance with an example embodiment.

Block 1000 states simultaneously display, with an electronic device, two or more sound sources to a person during a telephone call.

For example, a display of an HPED simultaneously displays two or more sound sources that represent users to the telephone call. For instance, each person to a conference call or video call is displayed on the display.

For example, a wearable electronic device (e.g., electronic glasses, a HMD, or a smartphone worn on a head of a person) displays an AR or VR image of each user to the telephone call.

The sound sources include the wearer or holder or user of the electronic device. For example, a caller calls a person who wears or holds a portable electronic device, and this electronic device displays an image of a caller and also an image of the person to the person during the telephone call.

Block 1010 states convolve and/or process, during the telephone call, at least one voice of the one sound source being displayed with HRTFs having coordinate locations located behind the one sound source being displayed.

In an example embodiment, the coordinate location of the HRTFs for a sound source is directly behind the sound source. For instance, the coordinate location is located 0.1 m-1.0 m behind the location of the sound source. Further, the coordinate location is located on or about on a line-of-sight from the person to the sound source or on or near a ray extending from the center of the head of the person to the representation of a caller or sound on the telephone call.

The coordinate location of the HRTFs can be located off or away from the ray/line-of-sight or at an angle with respect to the ray or line-of-sight. For example, the coordinate location of the HRTFs is angled from the line-of-sight by an azimuth angle ($\theta$) and/or elevation angle ($\phi$) of 1°, 2°, 3°, 4°, 5°, 6°, 7°, 8°, 9°, 10°, 15°, 20°, or 25°.

Figure 11:
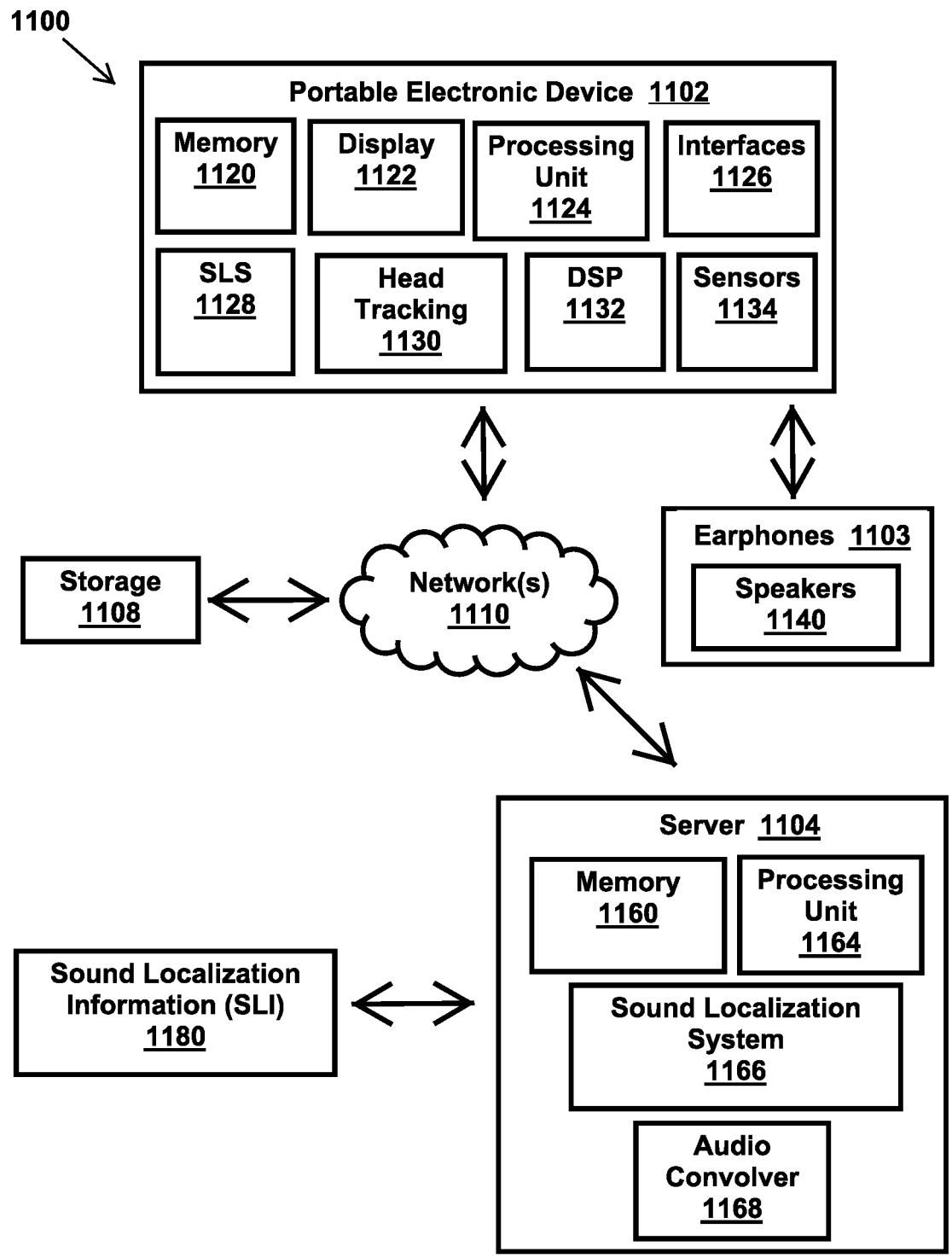
FIG. 11 is a computer system or electronic system in accordance with an example embodiment.

FIG. 11 is a computer system or electronic system 1100 in accordance with an example embodiment. The computer system includes one or more of a portable electronic device or PED 1102, one or more computers or electronic devices (such as one or more servers) 1104, and storage or memory 1108 in communication over one or more networks 1110.

The portable electronic device 1102 includes one or more components of computer readable medium (CRM) or memory 1120 (such as cache memory and memory storing instructions to execute one or more example embodiments), a display 1122, a processing unit 1124 (such as one or more processors, microprocessors, and/or microcontrollers), one or more interfaces 1126 (such as a network interface, a graphical user interface, a natural language user interface, a natural user interface, a phone control interface, a reality user interface, a kinetic user interface, a touchless user interface, an augmented reality user interface, and/or an interface that combines reality and virtuality), a sound localization system (SLS) 1128, head tracking 1130, a digital signal processor (DSP) 1132, and one or more sensors 1134 (such as a camera, proximity sensor, or other sensor discussed herein).

The PED 1102 communicates with wired or wireless headphones or earphones 1103 that include speakers 1140 and/or other electronics (such as microphones).

The storage 1108 includes one or more of memory or databases that store one or more of audio files, sound information, sound localization information, audio input, SLPs and/or zones, software applications, user profiles and/ or user preferences (such as user preferences for SLP locations and sound localization preferences), impulse responses and transfer functions (such as HRTFs, HRIRs, BRIRs, and RIRs), and other information discussed herein.

The network 1110 includes one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices couple together via one or more wires, such as a direct wired-connection. As another example, electronic devices communicate directly through a wireless protocol, such as Bluetooth, near field communication (NFC), or other wireless communication protocol.

Electronic device 1104 (shown by way of example as a server) includes one or more components of computer readable medium (CRM) or memory 1160 (including cache memory), a processing unit 1164 (such as one or more processors, microprocessors, and/or microcontrollers), a sound localization system 1166, and an audio or sound convolver 1168.

The electronic device 1104 communicates with the PED 1102 and with storage or memory that stores sound localization information (SLI) 1180, such as transfer functions and/or impulse responses (e.g., HRTFs, HRIRs, BRIRs, etc. for multiple users) and other information discussed herein. Alternatively or additionally, the transfer functions and/or impulse responses and other SLI are stored in memory 1120 or another location, such as storage 1108.

Figure 12:
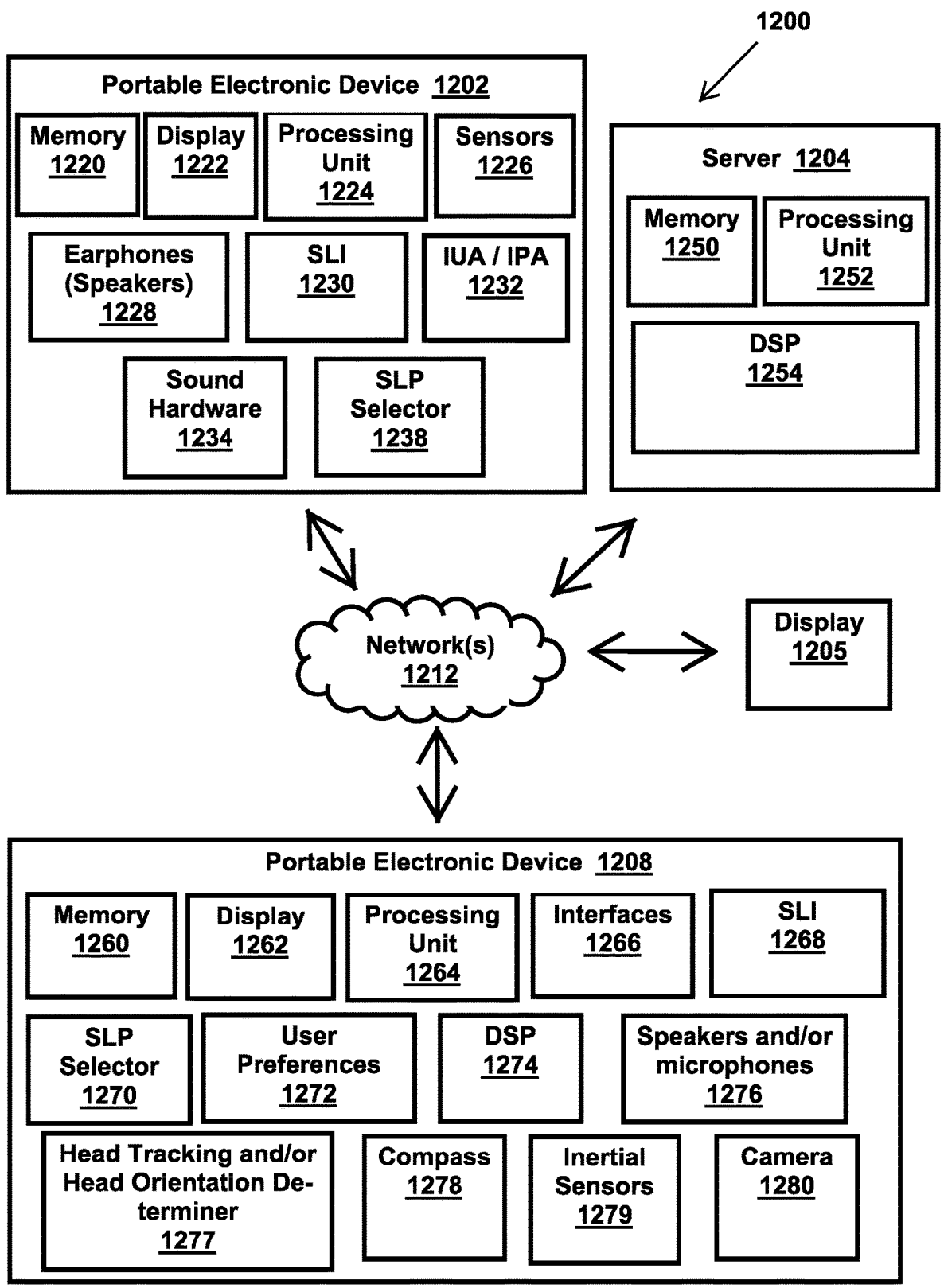
FIG. 12 is a computer system or electronic system in accordance with an example embodiment.

FIG. 12 is a computer system or electronic system in accordance with an example embodiment. The computer system 1200 includes one or more of a portable electronic device 1202, a server 1204, a portable electronic device 1208 (including wearable electronic devices and handheld portable electronic devices), and a display 1205 in communication with each other over one or more networks 1212.

Portable electronic device 1202 includes one or more components of computer readable medium (CRM) or memory 1220 (including cache memory), one or more displays 1222, a processor or processing unit 1224 (such as one or more microprocessors and/or microcontrollers), one or more sensors 1226 (such as a micro-electro-mechanical systems sensor, a proximity sensor, a biometric sensor, an optical sensor, a radio-frequency identification sensor, a global positioning satellite (GPS) sensor, a solid state compass, a gyroscope, a magnetometer, and/or an accelerometer), earphones with speakers 1228, sound localization information (SLI) 1230, an intelligent user agent (IUA) and/or intelligent personal assistant (IPA) 1232, sound hardware 1234, and a SLP selector 1238.

Server 1204 includes computer readable medium (CRM) or memory 1250, a processor or processing unit 1252, and a DSP 1254 and/or other hardware to convolve audio in accordance with an example embodiment.

Portable electronic device 1208 includes computer readable medium (CRM) or memory 1260 (including cache memory), one or more displays 1262, a processor or processing unit 1264, one or more interfaces 1266 (such as interfaces discussed herein in FIG. 11), sound localization information 1268 (e.g., stored in memory), a sound localization point (SLP) selector 1270, user preferences 1272, one or more digital signal processors (DSP) 1274, one or more of speakers and/or microphones 1276, head tracking and/or head orientation determiner 1277, a compass 1278, inertial sensors 1279 (such as an accelerometer, a gyroscope, and/or a magnetometer), and a camera 1280.

A sound localization point (SLP) selector includes specialized hardware and/or software to execute example embodiments that select a desired SLP for where binaural sound will localize to a user and/or select coordinate locations of HRTFs being executed to convolve the sound.

A sound localization system (SLS) and SLP selector include one or more of a processor, core, chip, microprocessor, controller, memory, specialized hardware, and specialized software to execute one or more example embodiments (including one or more methods discussed herein and/or blocks discussed in a method). By way of example, the hardware includes a customized integrated circuit (IC) or customized system-on-chip (SoC) to select, assign, and/or designate a SLP or a coordinate location for sound and convolve sound with SLI to generate binaural sound. For instance, an application-specific integrated circuit (ASIC) or a structured ASIC are examples of a customized IC that is designed for a particular use, as opposed to a general-purpose use. Such specialized hardware also includes field-programmable gate arrays (FPGAs) designed to execute a method discussed herein and/or one or more blocks discussed herein. For example, FPGAs are programmed to execute selecting, assigning, and/or designating SLPs and coordinate locations for sound or convolving, processing, or preprocessing sound so the sound externally localizes to the listener.

The sound localization system (SLS) performs various tasks with regard to managing, generating, interpolating, extrapolating, retrieving, storing, and selecting SLPs and coordinate locations and can function in coordination with and/or be part of the processing unit and/or DSPs or can incorporate DSPs. These tasks include, determining coordinates of SLPs and other coordinate locations and their corresponding HRTFs, switching and/or changing sound between binaural sound and mono sound or stereo sound, selecting SLPs and/or coordinate locations of HRTFs for a user, selecting sound sources to which sound will localize to a user, designating a type of sound, segment of audio, or sound source, providing binaural sound to users at a SLP, prefetching and/or preprocessing SLI, and executing one or more other blocks discussed herein. The sound localization system can also include a sound convolving application that convolves and de-convolves sound according to one or more audio impulse responses and/or transfer functions based on or in communication with head tracking.

In an example embodiment, the SLS calculates the line-of-sight or imaginary line from the head of the listener to the sound source and retrieves SLI (including HRTFs) based on the location of the line. For instance, two points or locations determine a line. One point is located at the head of the listener. Information about the head orientation of the listener can be determined from or calculated from a camera or a head tracking and/or head orientation determiner (e.g., hardware and/or software in a head mounted display or other wearable electronic device). A second point is located at the origin of the sound, such as the electronic device, sound source, etc. Information about the location of the second point can be determined from or calculated from a camera, a sensor, tag or RFID, or an electronic device. For instance, an electronic device calculates its position with respect to a head of the listener using one or more of a camera, facial recognition, a MEMS sensor (e.g., a multi-axis sensor with 9 degrees of freedom), wireless short-range communication with another electronic device (e.g., communication between an HPED and a wearable electronic device or electronic device in an Internet-of-Things (IoT) network), or other method.

By way of example, an intelligent personal assistant or intelligent user agent is a software agent that performs tasks or services for a person, such as organizing and maintaining information (such as emails, messaging (e.g., instant messaging, mobile messaging, voice messaging, store and forward messaging), calendar events, files, to-do items, etc.), initiating telephony requests (e.g., scheduling, initiating, and/or triggering phone calls, video calls, and telepresence requests between the user, IPA, other users, and other IPAs), responding to queries, responding to search requests, information retrieval, performing specific one-time tasks (such as responding to a voice instruction), file request and retrieval (such as retrieving and triggering a sound or video to play, or text or images to display), timely or passive data collection or information-gathering from persons or users (such as querying a user for information), data and voice storage, management and recall (such as taking dictation, storing memos, managing lists), memory aid, reminding of users, performing ongoing tasks (such as schedule management and personal health or finance management), and providing recommendations. By way of example, these tasks or services are based on one or more of user input, prediction, activity awareness, location awareness, an ability to access information (including user profile information and online information), user profile information, and other data or information.

By way of example, the sound hardware includes a sound card and/or a sound chip. A sound card includes one or more of a digital-to-analog (DAC) converter, an analog-to-digital (ATD) converter, a line-in connector for an input signal from a source of sound, a line-out connector, a hardware audio accelerator providing hardware polyphony, and one or more digital-signal-processors (DSPs). A sound chip is an integrated circuit (also known as a "chip") that produces sound through digital, analog, or mixed-mode electronics and includes electronic devices such as one or more of an oscillator, envelope controller, sampler, filter, and amplifier. The sound hardware can be or include customized or specialized hardware that processes and convolves mono and stereo sound into binaural sound.

By way of example, a computer and a portable electronic device include, but are not limited to, handheld portable electronic devices (HPEDs), wearable electronic glasses, smartglasses, watches, wearable electronic devices (WEDs) or wearables, smart earphones or hearables, voice control devices (VCD), voice personal assistants (VPAs), network attached storage (NAS), printers and peripheral devices, virtual devices or emulated devices (e.g., device simulators, soft devices), cloud resident devices, computing devices, electronic devices with cellular or mobile phone capabilities, digital cameras, desktop computers, servers, portable computers (such as tablet and notebook computers), smartphones, electronic and computer game consoles, home entertainment systems, digital audio players (DAPs) and handheld audio playing devices (example, handheld devices for downloading and playing music and videos), appliances (including home appliances), head mounted displays (HMDs), optical head mounted displays (OHMDs), personal digital assistants (PDAs), electronics and electronic systems in automobiles (including automobile control systems), combinations of these devices, devices with a processor or processing unit and a memory, and other portable and non-portable electronic devices and systems (such as electronic devices with a DSP and/or sound hardware as discussed herein).

The SLP selector and/or SLS can also execute retrieving SLI, preprocessing, predicting, and caching including, but not limited to, predicting an action of a user, predicting a location of a user, predicting motion of a user such as a gesture, a change in a head displacement and/or orientation, predicting a trajectory of a sound localization to a user, predicting an event, predicting a desire or want of a user, predicting a query of a user (such as a query to or response from an intelligent personal assistant), predicting and/or recommending a SLP, zone, or RIR/RTF to a user, etc. Such predictions can also include predicting user actions or requests in the future (such as a likelihood that the user or electronic device localizes a type of sound to a particular SLP or zone). For instance, determinations by a software application, hardware, an electronic device, and/or user agent are modeled as a prediction that the user will take an action and/or desire or benefit from moving or muting a SLP, from delaying the playing of a sound, from a switch between binaural, mono, and stereo sounds or a change to binaural sound (such as pausing binaural sound, muting binaural sound, selecting an object at which to localize sound, reducing or eliminating one or more cues or spatializations or localizations of binaural sound). For example, an analysis of historical events, personal information, geographic location, and/or the user profile provides a probability and/or likelihood that the user will take an action (such as whether the user prefers a particular SLP or zone as the location for where sound will localize, prefers binaural sound or stereo, or mono sound for a particular location, prefers a particular listening experience, or a particular communication with another person or an intelligent personal assistant). By way of example, one or more predictive models execute to predict the probability that a user would take, determine, or desire the action. The predictor also predicts future events unrelated to the actions of the user including, but not limited to, a prediction of times, locations, or identities of incoming callers or virtual sound source requests for sound localizations to the user, a type or quality of inbound sound, predicting a sound source or virtual sound source path including a change in orientation of the sound source or virtual sound source or SLP such as a change in a direction of source emission of the SLP.

Example embodiments are not limited to HRTFs but also include other sound transfer functions and sound impulse responses including, but not limited to, head related impulse responses (HRIRs), room transfer functions (RTFs), room impulse responses (RIRs), binaural room impulse responses (BRIRs), binaural room transfer functions (BRTFs), headphone transfer functions (HPTFs), etc.

Examples herein can take place in physical spaces, in computer rendered spaces (such as computer games or VR), in partially computer rendered spaces (AR), and in combinations thereof.

The processor unit includes a processor (such as a central processing unit, CPU, microprocessor, microcontrollers, field programmable gate arrays (FPGA), application-specific integrated circuits (ASIC), etc.) for controlling the overall operation of memory (such as random access memory (RAM) for temporary data storage, read-only memory (ROM) for permanent data storage, and firmware). The processing unit and DSP communicate with each other and memory and perform operations and tasks that implement one or more blocks of the flow diagrams discussed herein. The memory, for example, stores applications, data, programs, algorithms (including software to implement or assist in implementing example embodiments) and other data.

Consider an example embodiment in which the SLS includes an integrated circuit FPGA that is specifically customized, designed, configured, or wired to execute one or more blocks discussed herein. For example, the FPGA includes one or more programmable logic blocks that are wired together or configured to execute combinational functions for the SLS (e.g., changing between binaural sound and mono sound upon detecting rotation of the HPED or detecting another action discussed herein).

Consider an example in which the SLS includes an integrated circuit or ASIC that is specifically customized, designed, or configured to execute one or more blocks discussed herein. For example, the ASIC has customized gate arrangements for the SLS. The ASIC can also include microprocessors and memory blocks (such as being a SoC (system-on-chip) designed with special functionality to execute functions of the SLS and/or blocks of methods discussed herein).

Consider an example in which the SLS includes one or more integrated circuits that are specifically customized, designed, or configured to execute one or more blocks discussed herein. For example, the electronic devices include a specialized or customized processor or microprocessor or semiconductor intellectual property (SIP) core or digital signal processor (DSP) with a hardware architecture optimized for convolving sound and executing one or more example embodiments.

Consider an example in which the HPED includes a customized or dedicated DSP that executes one or more blocks discussed herein (including processing and/or convolving sound into binaural sound). Such a DSP has a better power performance or power efficiency compared to a general-purpose microprocessor and is more suitable for a HPED, such as a smartphone, due to power consumption constraints of the HPED. The DSP can also include a specialized hardware architecture, such as a special or specialized memory architecture to simultaneously fetch or prefetch multiple data and/or instructions concurrently to increase execution speed and sound processing efficiency. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

Consider an example in which the DSP includes the SLP selector. For example, the SLP selector and/or the DSP are integrated onto a single integrated circuit die or integrated onto multiple dies in a single chip package to expedite binaural sound processing.

Consider another example in which HRTFs (such as a custom or personal set of HRTFs created for a certain user or users, or other transfer functions or impulse responses) are stored or cached in the DSP memory or local memory relatively close to the DSP to expedite binaural sound processing.

Consider an example in which a smartphone or other PED includes one or more dedicated sound DSPs (or dedicated DSPs for sound processing, image processing, and/or video processing). The DSPs execute instructions to convolve sound and display locations of images or SLPs for the sound on a user interface of a HPED. Further, the DSPs simultaneously convolve multiple sound sources or SLPs to a user. These sound sources or SLPs can be moving with respect to the face of the user so the DSPs convolve multiple different sound signals and virtual sound sources with HRTFs that are continually, continuously, or rapidly changing.

As used herein, the word "about" when indicated with a number, amount, time, etc. is close or near something. By way of example, for spherical or polar coordinates of a SLP (r, θ, ϕ), the word "about" means plus or minus (±) three degrees for θ and ϕ and plus or minus 5% for distance (r).

As used herein, "empty space" is a location that is not occupied by a tangible object.

As used herein, "field-of-view" is the observable world that is seen at a given moment. Field-of-view includes what a user or camera sees in a virtual or augmented world (e.g., what the user sees while wearing a HMD or OHMD).

As used herein, "line-of-sight" is a line from an observer's eye to a location.

As used herein, "proximate" means near. For example, a sound that localizes proximate to a listener occurs within two meters of the person.

As used herein, "sound localization information" or "SLI" is information that an electronic device uses to process or convolve sound so the sound externally localizes as binaural sound to a listener. Examples of SLI include head related transfer functions (HRTFs), head related impulse responses (HRIRs), binaural room impulse responses (BRIRs), room impulse responses (RIRs), interaural level differences (ILDs), and interaural time differences (ITDs).

As used herein, a "sound localization point" or "SLP" is a location where a listener localizes sound. A SLP can be internal (such as monaural sound that localizes inside a head of a listener wearing headphones or earbuds), or a SLP can be external (such as binaural sound that externally localizes to a point or an area that is away from but proximate to the person or away from but not near the person). A SLP can be a single point such as one defined by a single pair of HRTFs or a SLP can be a zone or shape or volume or general area, such as a line or a cylindrical volume. Further, in some instances, multiple impulse responses or transfer functions can process or convolve sounds to a place within the boundary of the SLP. In some instances, HRTFs necessary to produce a particular SLP for a particular user may not have been created. A HRTF may not be required to provide a SLP or localize sound for a user, such as for an internalized SLP, or a SLP may be rendered by adjusting an ITD and/or ILD or other human audial cues.

A "sound source" and a "source of sound" are interchangeable and are a real or virtual object or location to where a listener localizes binaural sound, such as an object to which a listener externally localizes binaural sound. Examples include, but are not limited to, an electronic device, an image, a physical or real or tangible object, a virtual object or VR image, a video, a picture, an AR image, a virtual sound source, a display, a location from where a listener is intended to localize binaural sound, a combination of one or more of these examples, and other examples provided herein.

As used herein, "spherical coordinates" or "spherical coordinate system" provides a coordinate system in 3D space in which a position is given with three numbers: a radial distance (r) from an origin, an azimuth angle (θ) of its orthogonal projection on a reference plane that is orthogonal to the zenith direction and that passes through the origin, and an elevation or polar angle (ϕ) that is measured from the zenith direction.

As used herein, a "telephone call," or a "phone call" or "telephony" is a connection over a wired and/or wireless network between a calling person or user and a called person or user. Telephone calls can use landlines, mobile phones, satellite phones, HPEDs, voice personal assistants (VPAs), computers, and other portable and non-portable electronic devices. Further, telephone calls can be placed through one or more of a public switched telephone network, the internet, and various types of networks (such as Wide Area Networks or WANs, Local Area Networks or LANs, Personal Area Networks or PANs, home area networks or HAMs, Campus Area Networks or CANs, etc.). Telephone calls include other types of telephony including Voice over Internet Protocol (VoIP) calls, video calls, conference calls, internet telephone calls, in-game calls, telepresence, etc.

As used herein, "three-dimensional space" or "3D space" is space in which three values or parameters are used to determine a position of an object or point. For example, binaural sound can localize to locations in 3D space around a head of a listener. 3D space can also exist in virtual reality (e.g., a user wearing a HMD can see a virtual 3D space).

As used herein, a "user" or a "listener" is a person (i.e., a human being). These terms can also be a software program (including an IPA or IUA), hardware (such as a processor or processing unit), an electronic device or a computer (such as a speaking robot or avatar shaped like a human with microphones or points of virtual microphones in or at its ears).

As used herein, a "video call" is a telephone call in which one or more people to the video call see video of the other person.

As used herein, a "virtual sound source" is a sound source in virtual auditory space (aka virtual acoustic space). For example, listeners hear a virtual sound source at one or more SLPs.

Impulse responses can be transformed into their respective transfer functions. For example, a RIR has an equivalent transfer function of a RTF; a BRIR has an equivalent transfer function of a BRIR; and a HRIR has an equivalent transfer function of a HRTF.

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as NAND flash non-volatile memory, DRAM, or SRAM, Erasable and Programmable Read-Only Memories (EPROMs), Electrically Erasable and Programmable Read-Only Memories (EEPROMs), solid state drives (SSD), and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

The methods in accordance with example embodiments are provided as examples, and examples from one method should not be construed to limit examples from another method. Tables and other information show example data and example structures; other data and other database structures can be implemented with example embodiments. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method, comprising:
   displaying, with a wearable electronic device (WED) worn on a head a user, a virtual object that appears within a near-field distance from the user; and
   processing, with one or more processors in the WED, sound for the virtual object to generate binaural sound that has a sound localization point (SLP) with a coordinate location at a far-field distance from the user that occurs along a line-of-sight from the user to the virtual object and behind the virtual object while the virtual object is within the near-field distance from the user.

2. The method of claim 1 further comprising:
   tracking, with one or more sensors in the WED, movement of the head of the user; and
   processing, with the one or more processors and while the head of the user moves with respect to the virtual object, the sound for the virtual object such that the SLP remains behind the virtual object while the virtual object remains within the near-field distance.

3. The method of claim 1 further comprising:
   continuing to process, with the one or more processors, the sound for the virtual object with far-field head-related transfer functions (HRTFs) while the sound emanates from the virtual object with the virtual object located within the near-field distance from the user.

4. The method of claim 1 further comprising:
   sensing, with one or more sensors in the WED, movement of the WED while worn on the head of the user; and
   automatically lowering a volume of the sound in response to the one or more sensors sensing the movement.

5. The method of claim 1, wherein the one or more processors include a digital signal processor (DSP) that processes the sound for the virtual object that is displayed within the near-field distance from the user with far-field head-related transfer functions (HRTFs) as long as the sound originates from the virtual object with the user located within the near-field distance from the virtual object.

6. The method of claim 1, wherein the coordinate location of the SLP is located a distance (d1) from the head of the user in which d1>1.0 meter, the virtual object is located a distance (d2) from the head of the user in which d2<1.0 meter, the WED is a head mounted display (HMD), and the virtual object occurs in virtual reality (VR).

7. The method of claim 1 further comprising:
   sensing, with one or more sensors in the WED, movement of the WED while worn on the head of the user; and
   automatically muting the sound in response to the one or more sensors sensing the movement.

8. A wearable electronic device (WED) worn on a head of a user, the WED comprising:
   a display that displays a virtual image that occurs within a near-field distance from the head of the user; and
   a digital signal processor (DSP) that processes sound for the virtual image with far-field head-related transfer functions (HRTFs) to generate binaural sound that has a sound localization point (SLP) that occurs at a far-field distance located behind the virtual image and along a line-of-sight from the user to the virtual image while the virtual image is located within a near-field distance from the head of the user.

9. The WED of claim 8, wherein the virtual image is an augmented reality (AR) image, and the display is included with electronic glasses worn on the head of the user.

10. The WED of claim 8, wherein the virtual image is a virtual reality (VR) image, and the display is included with a head mounted display (HMD) worn on the head of the user.

11. The WED of claim 8 further comprising:
one or more sensors that sense movement of the WED while the WED is worn on the head of the user, wherein the WED lowers a volume of the sound in response to the one or more sensors sensing the movement.

12. The WED of claim 8 further comprising:
one or more sensors that sense movement of the WED while the WED is worn on the head of the user, wherein the WED mutes the sound in response to the one or more sensors sensing the movement.

13. The WED of claim 8 further comprising:
one or more sensors that sense movement of the WED while the WED is worn on the head of the user, wherein the WED terminates an electronic call in response to the one or more sensors sensing the movement.

14. The WED of claim 8, wherein the virtual image is an augmented reality (AR) image of an intelligent user assistant (IUA) that is located less than one meter away from the head of the user, and a voice of the IUA occurs at a coordinate location behind the AR image of the IUA when the AR image is within the near-field distance from the head of the user.

15. The WED of claim 8, wherein the virtual image is a virtual reality (VR) image of an intelligent user assistant (IUA) that is located less than one meter away from the head of the user, and a voice of the IUA occurs at a coordinate location behind the VR image of the IUA when the VR image is within the near-field distance from the head of the user.

16. A wearable electronic device (WED) worn on a head of a user, the WED comprising:
a display that displays a virtual image that is located within a near-field distance from the head of the user viewing the virtual image; and
one or more processors that process sound for the virtual image with head-related transfer functions (HRTFs) to generate binaural sound that has a sound localization point (SLP) with a coordinate location that occurs at a far-field distance located behind the virtual image along a line-of-sight from the user to the virtual image while the display displays the virtual image to the user at the near-field distance, wherein the coordinate location of the binaural sound continues to occur at the far-field distance located behind the virtual image when the head of the user moves while the virtual image remains within the near-field distance from the head of the user.

17. The WED of claim 16, wherein the display is an augmented reality (AR) display worn on the head of the user viewing the virtual image, and the virtual image is an AR image.

18. The WED of claim 16, wherein the display is a virtual reality (VR) display worn on the head of the user viewing the virtual image, and the virtual image is a VR image.

19. The WED of claim 16 further comprising:
one or more sensors that sense a direction of gaze of the user, wherein the WED mutes the sound in response to sensing that the direction of gaze is not directed to the virtual image.

20. The WED of claim 16 further comprising:
one or more sensors that sense a direction of gaze of the user, wherein the WED switches the sound to mono sound or stereo sound in response to sensing that the direction of gaze is not directed to the virtual image.

* * * * *